United States Patent
Polonowski et al.

(10) Patent No.: US 12,441,295 B2
(45) Date of Patent: Oct. 14, 2025

(54) SYSTEM AND METHODS FOR IN-USE NOx ROBUSTNESS EMISSION CONTROL

(71) Applicant: Ford Global Technologies, LLC, Dearborn, MI (US)

(72) Inventors: Chris Polonowski, Brighton, MI (US); Kyle Pohlkamp, Waunakee, WI (US); Eric Kurtz, Dearborn, MI (US); Paul J. Tennison, West Bloomfield, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 244 days.

(21) Appl. No.: 18/192,907

(22) Filed: Mar. 30, 2023

(65) Prior Publication Data
US 2024/0326778 A1 Oct. 3, 2024

(51) Int. Cl.
*B60W 20/16* (2016.01)
*B60W 10/04* (2006.01)
(Continued)

(52) U.S. Cl.
CPC ............ *B60W 20/16* (2016.01); *B60W 10/04* (2013.01); *B60W 10/24* (2013.01);
(Continued)

(58) Field of Classification Search
CPC ...... B60W 20/16; B60W 10/04; B60W 10/24; B60W 50/0097; B60W 2050/0026; B60W 2400/00; B60W 2510/06; B60W 2556/10; B60W 2710/244; B60W 10/06; B60W 10/08; F01N 3/208; F01N 2560/026; F01N 2610/02; F01N 2900/0411; F01N 2900/08; F01N 2900/10; F01N 2900/1402;
(Continued)

(56) References Cited

U.S. PATENT DOCUMENTS 6,195,607 B1 * 2/2001 Rajamani ................. F02C 7/22
701/100
8,392,091 B2 3/2013 Hebbale et al.
(Continued)

FOREIGN PATENT DOCUMENTS

CN 112127978 B 12/2021
DE 102005034347 A1 1/2007
(Continued)

*Primary Examiner* — B M M Hannan
(74) *Attorney, Agent, or Firm* — Vincent Mastrogiacomo; McCoy Russell LLP

(57) ABSTRACT

Methods and systems are provided for optimizing a performance of a vehicle while maintaining vehicle emissions below a threshold. In one example, a method for a controller of a vehicle comprises adjusting an operating parameter of the vehicle in response to a margin between a moving average tailpipe NOx emissions and a threshold tailpipe NOx emissions decreasing below a threshold NOx emissions margin, the moving average tailpipe NOx emissions calculated at regular intervals over a plurality of overlapping moving average windows (MAWs) of measured tailpipe NOx emissions. The threshold tailpipe NOx margin may be predicted based on expected engine-out NOx emissions of the vehicle, current NOx emissions sensitivities, and/or a predicted catalyst conversion efficiency in relation to the expected engine-out NOx emissions.

19 Claims, 8 Drawing Sheets

(51) Int. Cl.
  *B60W 10/24* (2006.01)
  *B60W 50/00* (2006.01)
(52) U.S. Cl.
  CPC . *B60W 50/0097* (2013.01); *B60W 2050/0026* (2013.01); *B60W 2400/00* (2013.01); *B60W 2510/06* (2013.01); *B60W 2556/10* (2020.02)
(58) Field of Classification Search
  CPC .............. F01N 2900/1621; F01N 9/00; F02D 41/0235; F02D 29/02; F02D 41/0002; F02D 41/0055; F02D 41/0215; F02D 41/1439; F02D 41/1463; F02D 2041/0265; F02D 2200/50; F02D 2200/60; F02D 2200/70; F02D 2200/701; F02D 2200/702; F02D 2250/36
  USPC .......................................................... 701/22
  See application file for complete search history.

(56) References Cited

U.S. PATENT DOCUMENTS

| | | | | |
|---|---|---|---|---|
| 10,934,918 | B1* | 3/2021 | Goffe | B01D 53/9427 |
| 2004/0139735 | A1 | 7/2004 | Zhu | |
| 2011/0162350 | A1* | 7/2011 | Ponnathpur | F01N 9/00 60/274 |
| 2012/0216533 | A1* | 8/2012 | Schaffeld | F02D 41/10 60/611 |
| 2014/0208721 | A1* | 7/2014 | Khaled | F01N 3/208 73/23.31 |
| 2017/0350293 | A1* | 12/2017 | De Smet | F01N 3/0871 |
| 2018/0154305 | A1* | 6/2018 | Von Der Heide | B01D 53/56 |
| 2018/0154897 | A1* | 6/2018 | Willimowski | F01N 9/005 |
| 2019/0070547 | A1* | 3/2019 | Sappok | F01N 11/00 |
| 2019/0186318 | A1* | 6/2019 | Wang | B01D 53/9409 |
| 2020/0263583 | A1 | 8/2020 | Balthes et al. | |
| 2022/0219674 | A1* | 7/2022 | Light-Holets | B60W 40/00 |

FOREIGN PATENT DOCUMENTS

| | | |
|---|---|---|
| DE | 102007053406 B3 | 6/2009 |
| KR | 102329665 B1 | 11/2021 |
| WO | 2016174015 A1 | 11/2016 |
| WO | WO-2019134989 A1 * 7/2019 ......... G01C 21/3694 |

* cited by examiner

SYSTEM AND METHODS FOR IN-USE NOx ROBUSTNESS EMISSION CONTROL

FIELD

The present description relates generally to controlling emissions of an engine of a vehicle during operation.

BACKGROUND/SUMMARY

Vehicle emissions may be measured over a moving average window (MAW), where each averaging window is a specified duration (e.g., 300 seconds). New windows may begin at specified intervals (e.g., 1 second), resulting in a series of overlapping averaging windows with staggered starting times. Windows may be assigned to bins based on a broad set of criteria contributing to an engine load. The bins may be evaluated with respect to a desired emission range for each respective bin. Based on the results, vehicle and/or engine operating parameters may be adjusted to optimize for vehicle performance and/or reduce emissions.

However, the inventors herein have recognized that MAW emissions may be sensitive to a wide variety of compounding factors, including but not limited to vehicle gross combination weight (GCW), catalyst state (temperature, NH3 storage, age), elevation, inclination, route, weather (humidity, temperature, wind), and driver aggressiveness. Due to the wide variety of compounding factors, calibrating the engine to reduce emissions for a worst-case stack-up of sensitivities using traditional methods may result in degraded vehicle performance for all drivers in all scenarios. However, a very small subset of drivers will be in a scenario where that magnitude of emissions reduction is desired. Determining a set of adjustments that manages a tradeoff between emissions reduction and vehicle performance under different likely driving scenarios and conditions may be difficult.

In one example, the issues described above may be at least partially addressed by a method for a controller of a vehicle, comprising adjusting an operating parameter of the vehicle in response to a margin between a moving average tailpipe NOx emissions and a threshold tailpipe NOx emissions decreasing below a threshold NOx emissions margin, the moving average tailpipe NOx emissions calculated at regular intervals over a plurality of overlapping moving average windows (MAWs) of measured tailpipe NOx emissions. The threshold tailpipe NOx margin may be calculated based on predicted factors relating to expected engine-out NOx emissions of the vehicle, current NOx emissions sensitivities, and/or a predicted catalyst conversion efficiency in relation to the expected engine-out NOx emissions.

As a result, an estimated margin between actual MAW emissions and a threshold MAW emission level may be predicted for individual drive scenarios, and leveraged to provide a highest possible vehicle performance. The performance may be degraded when a driving scenario is predicted to exceed the threshold MAW emission level, and may not be degraded when the driving scenario is not predicted to exceed the threshold MAW emission level. Additionally or alternatively, in some embodiments, an early detection algorithm may be used to identify current windows having a probability of exceeding the threshold MAW emission level that exceeds a threshold probability, using projected data obtained early in the windows. If a current window with a higher-than-threshold probability of exceeding the threshold MAW emission level is identified, engine parameters may be calibrated to degrade the performance at an earlier stage, where an increased amount of time to meet emissions targets may result in a lesser amount of degradation having to be performed.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

Various aspects of this disclosure may be better understood upon reading the following detailed description and upon reference to the drawings in which.

DETAILED DESCRIPTION

Figure 1:
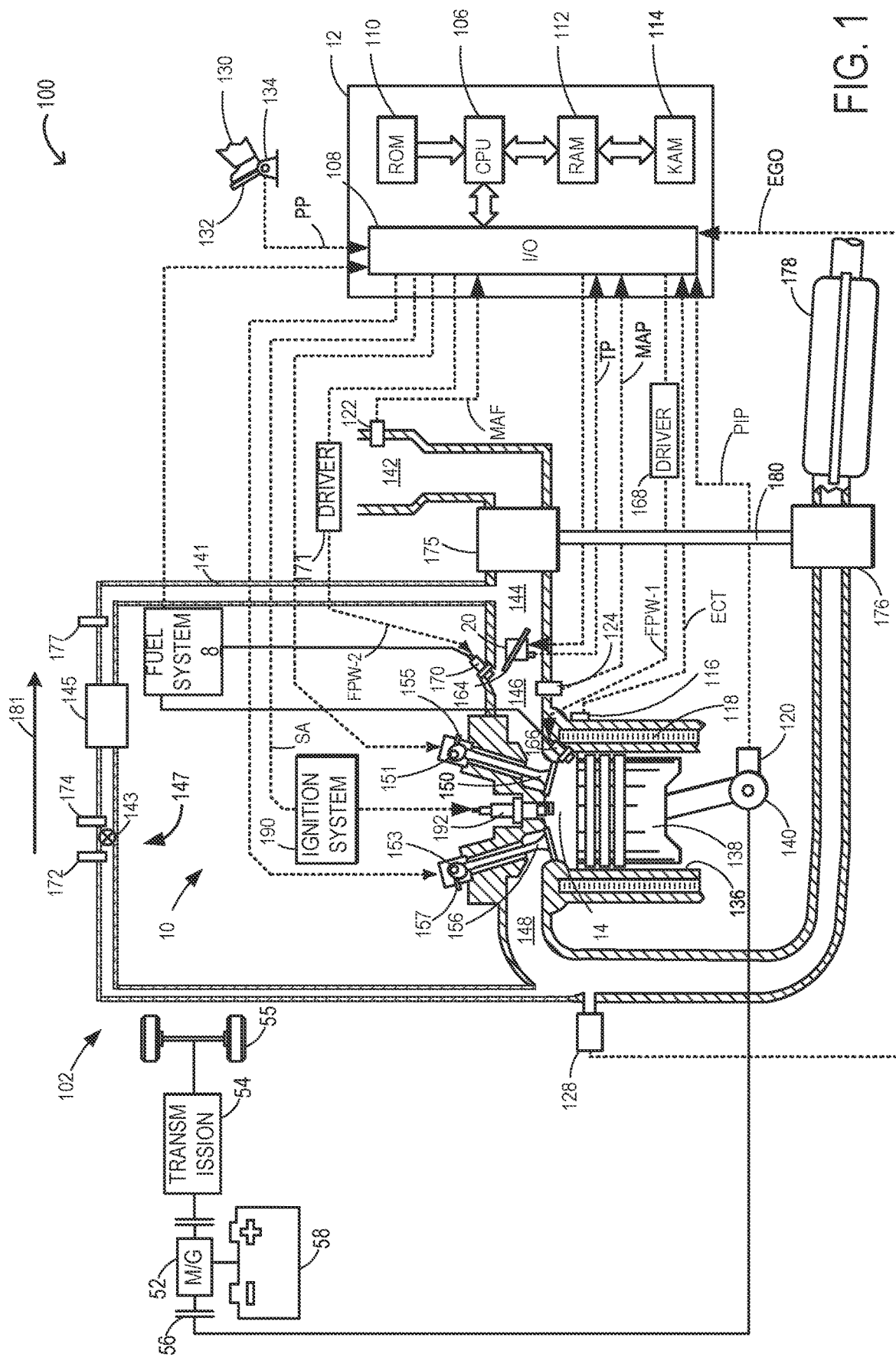
FIG. 1 shows an example engine system for a vehicle.

The following description relates to systems and methods for predicting an amount of emissions generated by a vehicle based on current driving conditions, and using the prediction to calibrate engine operation to optimize for engine performance without exceeding a predefined emissions threshold. Specifically, an electronic control unit (ECU) of the vehicle may predict a set of factors to estimate a margin between measured emissions and the predefined emissions threshold for current and future windows. An emission margin prediction algorithm may also utilize data from previously completed windows. The emissions margin prediction algorithm may output predicted margins and prediction confidence levels for current and future windows.

The output of the prediction algorithm may be utilized by an emissions margin controller, along with other inputs, including but not limited to a desired emissions margin, completed window data (margin threshold, bin, sensitivities), and engine data (speed, load, requested load, current emissions flow, expected emissions flow at a requested load, etc.). The emissions margin controller may make calibration adjustments to vehicle and/or engine parameters that cause tradeoffs between predicted emissions and vehicle performance, such that vehicle performance is maximized, and a probability of exceeding the desired emissions margin threshold for current and future windows is minimized.

For example, the emissions margin controller may apply a calculated derate of the engine based on an NOx catalyst outlet temperature, which acts as a surrogate for NOx conversion efficiency. When the NOx catalyst outlet temperature exceeds a calibrated temperature threshold, the emissions margin controller may command an engine ECU to apply a progressively increasing derate until the NOx catalyst outlet temperature drops below the calibrated temperature threshold. In this way, a desired NOx conversion efficiency for various driving scenarios may be ensured.

Further, in some embodiments, an additional early detection controller may evaluate a cumulative emissions level over a plurality of current windows as a function of an elapsed window time, and compare resulting curves (of one or more individual windows) to a target, reference curve. The early detection controller may or may not be integrated into the emissions margin controller. The comparison may be used for early detection of windows with a high probability of exceeding the threshold MAW emission level, by effectively setting a time-based cumulative emissions allowance for each window. For example, a window that has accumulated 20% of the cumulative emissions allowance in 5% of the window duration, could be assigned a high probability of exceeding the cumulative emissions allowance while it is still 80% below the limit. By detecting the high probability early, more time may be available to make calibration adjustments to ensure that the threshold MAW emission level is not exceeded. Additionally, adjustments may be smaller in magnitude, resulting in a less degraded vehicle performance. In contrast, if the high probability is detected too late, vehicle performance may be degraded significantly in an attempt to ensure that the threshold MAW emission level is not exceeded, which may not be possible if detected too late.

For example, a vehicle may be operating in a first driving scenario, where the first vehicle is operating on a flat road with a medium-sized load. Based on emissions sensitivities and/or catalyst conversion efficiency in relation to the engine-out emissions, the emissions margin controller may predict a first margin between an amount of emissions released by the vehicle and a reference emissions level (e.g., a first predicted MAW emissions margin) in future windows of the first driving scenario. The reference emissions level may be predefined in a reference table stored in a memory of the emissions margin controller. In one embodiment, the reference emissions level is established by local emissions standards. The emissions margin controller may adjust one or more operating parameters of the vehicle based on the first predicted MAW emissions margin. In the first driving scenario, the first predicted MAW emissions margin may be large, where the predicted emissions in the future windows may be well below the reference emissions level. As a result of the first predicted MAW emissions margin being large, a first adjustment may be performed on a set of operating parameters of the engine to optimize a performance of the vehicle in the first driving scenario (e.g., the flat road).

The vehicle may approach a hill and begin to climb up a steeper road grade. As the vehicle climbs, an engine load of the vehicle increases. The emissions margin controller may detect the increased engine load, and initiate a second driving scenario corresponding to the steeper road grade. Based on the emissions sensitivities and/or catalyst conversion efficiency in relation to the engine-out emissions in the second driving scenario, the emissions margin controller may predict a second margin between the amount of emissions released by the vehicle and the reference emissions level for future windows of the second driving scenario. The emissions margin controller may perform a second adjustment of the operating parameters of the vehicle based on the second predicted MAW emissions margin. The second adjustment may include the same parameters as the first set, or some or all of the parameters of the second adjustment may be different from some or all of the parameters of the first set.

In the second driving scenario, the second predicted MAW emissions margin may be small, where the predicted emissions in the future windows may approach the reference emissions level. As a result of the second predicted MAW emissions margin potentially approaching the reference emissions level (e.g., a threshold), the second set of operating parameters of the engine may be set to degrade a performance of the vehicle in the second driving scenario (e.g., the hill), to ensure that the emissions released by the vehicle do not exceed the reference emissions level.

Additionally, as the vehicle enters the second driving scenario, the early detection controller may perform a running evaluation of a cumulative emissions level of the vehicle over all current windows as a function of an elapsed window time. At various points in time during the second driving scenario, the early detection controller may plot and/or adjust a first curve corresponding to the cumulative emissions level of the vehicle during a first elapsed portion of a first MAW; the early detection controller may plot a second curve corresponding to the cumulative emissions level of the vehicle during a second elapsed portion of a second, overlapping MAW; the early detection controller may plot a third curve corresponding to the cumulative emissions level of the vehicle during a third elapsed portion of a third MAW, the third MAW overlapping both of the first and second MAWs; and so on.

The early detection controller may then compare each of the first, second, third, and additional curves, as they develop over time, to a target curve retrieved from a memory of the early detection controller. For example, the target curve may be selected from a reference table based on characteristics of the vehicle and/or the driving scenario, current NOx conversion efficiency levels, and/or other factors. The target curve may indicate an acceptable generation of NOx over a duration of an individual MAW, based on the reference emissions level. Comparing a curve of the first, second, third, and additional curves with the target curve may provide an indication, prior to reaching the end of a relevant MAW, of whether a cumulative amount of emissions of the vehicle over the relevant MAW may ultimately exceed the reference emissions level.

During the second driving cycle, the early detection controller may detect that the cumulative emissions level of the vehicle over one or more MAWs has a high probability of exceeding the reference emissions level, as a result of the increased engine load. In response to the detecting the high probability, a third adjustment to the operating parameters may be made to degrade the performance of the vehicle, to ensure that the emissions released by the vehicle do not exceed the reference emissions level. Because the high probability may be detected by the early detection controller before the second predicted MAW emissions margin is predicted by the emissions margin controller, the third adjustment may be performed by the early detection controller before the second adjustment is performed by the emissions margin controller. This may provide the engine more time to adjust, and a degradation of the performance by the third adjustment may be less than the second adjustment, resulting in an improved driving experience in the second driving scenario. Further, if as a result of the third adjustment the emissions begin to decrease, the second adjustment may not be performed.

Figure 6:
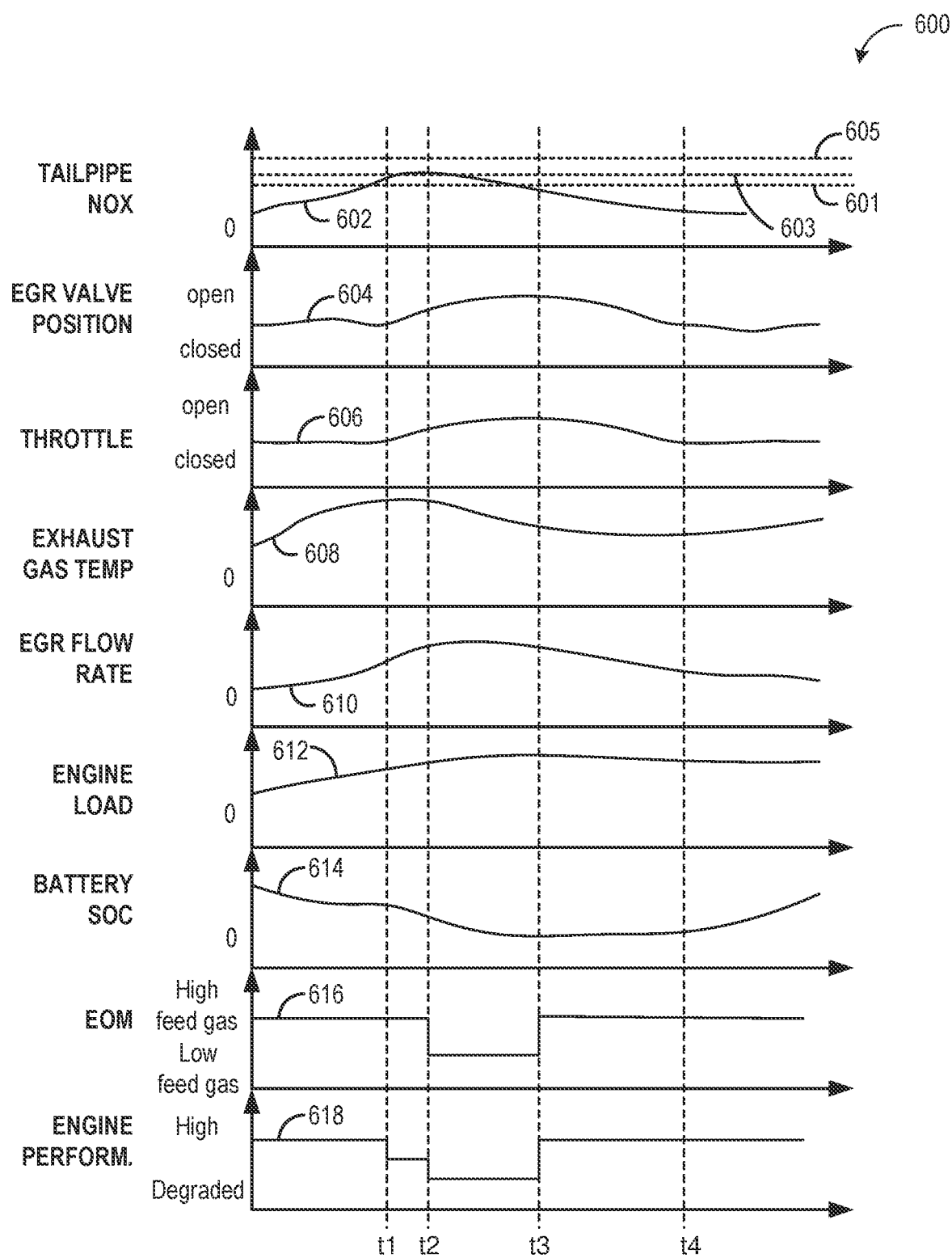
FIG. 6 is a timing diagram showing an exemplary sequence of events for reducing emissions of a hybrid electric vehicle, in accordance with one or more embodiments of the present disclosure.
Figure 7:
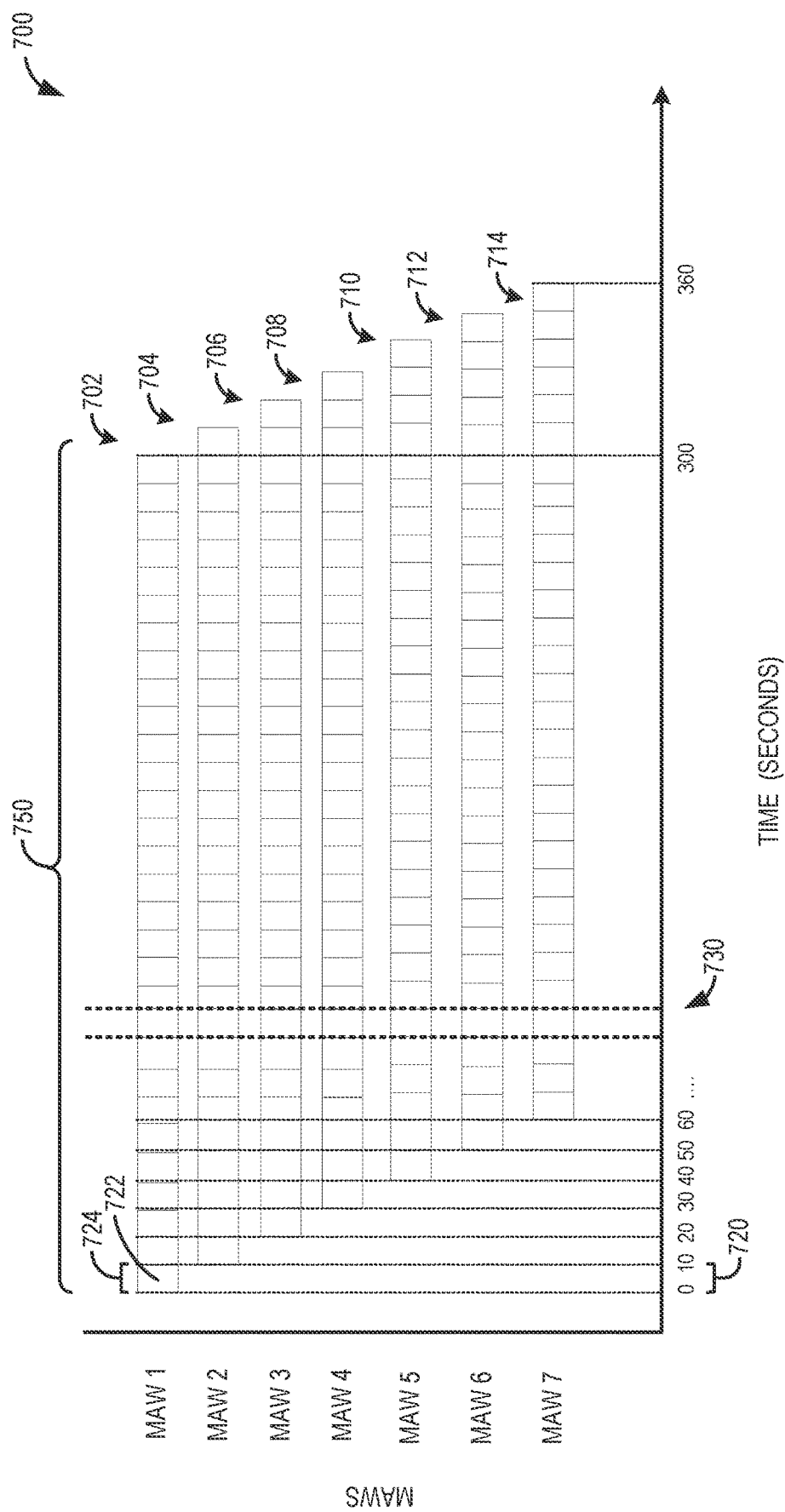
FIG. 7 is a diagram showing a set of staggered, overlapping moving average windows over which NOx emissions are measured, in accordance with one or more embodiments of the present disclosure.

An example engine system of a vehicle is shown in FIG. 1. The engine system may include an exhaust and EGR system, a simplified version of which is described in reference to FIG. 2. An amount of emissions generated by the engine systems of FIGS. 1 and 2 may be controlled, while optimizing for vehicle performance, by following one or more steps of the method of FIG. 3A. The method may include the exemplary method of FIG. 4 for calculating a minimum margin between predicted emissions and a desired emissions level. The emissions may be measured over a set of moving average windows, as shown in FIG. 7. Controlling the emissions may include performing one or more steps of the method shown in FIG. 5. An alternative method for controlling emissions while optimizing for vehicle performance is shown in FIG. 3B, which may be performed in conjunction with FIG. 3A. FIG. 6 shows a timing diagram indicating an exemplary sequence of events for reducing emissions of a vehicle, as the methods of FIGS. 3A, 3B, 4, and 5 are performed.

FIG. 1 depicts an exemplary engine system 100 of a vehicle 102 including a combustion chamber or cylinder of internal combustion engine 10. Engine 10 may receive control parameters from a control system including controller 12 and input from a vehicle operator 130 via an input device 132. In this example, input device 132 includes an accelerator pedal and a pedal position sensor 134 for generating a proportional pedal position signal PP. Cylinder (herein also "combustion chamber") 14 of engine 10 may include combustion chamber walls 136 with piston 138 positioned therein. Piston 138 may be coupled to crankshaft 140 so that reciprocating motion of the piston is translated into rotational motion of the crankshaft. Crankshaft 140 may be coupled to at least one drive wheel of the passenger vehicle via a transmission system. Further, a starter motor may be coupled to crankshaft 140 via a flywheel to enable a starting operation of engine 10.

Cylinder 14 can receive intake air via a series of intake air passages 142, 144, and 146. Intake air passage 146 may communicate with other cylinders of engine 10 in addition to cylinder 14. In some embodiments, one or more of the intake passages may include a boosting device such as a turbocharger or a supercharger. For example, FIG. 1 shows engine 10 configured with a turbocharger including a compressor 175 arranged between intake passages 142 and 144, and an exhaust turbine 176 arranged along exhaust passage 148. Compressor 175 may be at least partially powered by exhaust turbine 176 via a shaft 180 where the boosting device is configured as a turbocharger. The turbocharger may be a variable geometry turbocharge (VGT) where exhaust turbine 176 may include guiding vanes arranged in a nozzle of the turbine. Gas flow into the exhaust turbine 176 may be adjusted by varying a position of the guiding vanes. A throttle 20 including a throttle plate 164 may be provided along an intake passage of the engine for varying the flow rate and/or pressure of intake air provided to the engine cylinders. For example, throttle 20 may be disposed downstream of compressor 175 as shown in FIG. 1, or alternatively provided upstream of compressor 175.

Exhaust passage 148 may receive exhaust gases from other cylinders of engine 10 in addition to cylinder 14. Exhaust gas sensor 128 is shown coupled to exhaust passage 148 upstream of emission control device 178. Sensor 128 may be selected from among various suitable sensors for providing an indication of exhaust gas air/fuel ratio such as a linear oxygen sensor or UEGO (universal or wide-range exhaust gas oxygen), a two-state oxygen sensor or EGO (as depicted), a HEGO (heated EGO), a NOx, HC, or CO sensor, for example. Emission control device 178 may be a three way catalyst (TWC), NOx trap, various other emission control devices, or combinations thereof.

An exhaust temperature may be measured by one or more temperature sensors (not shown) located in exhaust passage 148. Alternatively, exhaust temperature may be inferred based on engine operating conditions such as speed, load, air-fuel ratio (AFR), spark retard, etc. Further, exhaust temperature may be computed by one or more exhaust gas sensors 128. It may be appreciated that the exhaust gas temperature may alternatively be estimated by any combination of temperature estimation methods.

Each cylinder of engine 10 may include one or more intake valves and one or more exhaust valves. For example, cylinder 14 is shown including at least one intake poppet valve 150 and at least one exhaust poppet valve 156 located at an upper region of cylinder 14. In some embodiments, each cylinder of engine 10, including cylinder 14, may include at least two intake poppet valves and at least two exhaust poppet valves located at an upper region of the cylinder.

Intake valve 150 may be controlled by controller 12 by cam actuation via cam actuation system 151. Similarly, exhaust valve 156 may be controlled by controller 12 via cam actuation system 153. Cam actuation systems 151 and 153 may each include one or more cams and may utilize one or more of cam profile switching (CPS), variable cam timing (VCT), variable valve timing (VVT) and/or variable valve lift (VVL) systems that may be operated by controller 12 to vary valve operation. The operation of intake valve 150 and exhaust valve 156 may be determined by valve position sensors (not shown) and/or camshaft position sensors 155 and 157, respectively. In alternative embodiments, the intake and/or exhaust valve may be controlled by electric valve actuation. For example, cylinder 14 may alternatively include an intake valve controlled via electric valve actuation and an exhaust valve controlled via cam actuation including CPS and/or VCT systems. In still other embodiments, the intake and exhaust valves may be controlled by a common valve actuator or actuation system, or a variable valve timing actuator or actuation system.

Cylinder 14 can have a compression ratio, which is the ratio of volumes when piston 138 is at bottom center to top center. Conventionally, the compression ratio is in the range of 9:1 to 10:1. However, in some examples where different fuels are used, the compression ratio may be increased. This may happen, for example, when higher octane fuels or fuels with higher latent enthalpy of vaporization are used. The compression ratio may also be increased if direct injection is used due to its effect on engine knock.

In some embodiments, each cylinder of engine 10 may include a spark plug 192 for initiating combustion. Ignition system 190 can provide an ignition spark to combustion cylinder 14 via spark plug 192 in response to spark advance signal from controller 12, under select operating modes. However, in some embodiments, spark plug 192 may be omitted, such as where engine 10 may initiate combustion by auto-ignition or by injection of fuel as may be the case with some diesel engines.

As a non-limiting example, cylinder 14 is shown including two fuel injectors 166 and 170. Fuel injector 166 is configured to deliver diesel or gasoline to the combustion chamber from fuel system 8 via a high pressure fuel pump, and a fuel rail. Alternatively, fuel may be delivered by a single stage fuel pump at lower pressure, in which case the timing of the direct fuel injection may be more limited during the compression stroke than if a high pressure fuel system is used. Further, the fuel tank may have a pressure transducer providing a signal to controller 12.

Fuel injector 166 is shown coupled directly to cylinder 14 for injecting fuel directly therein in proportion to the pulse width of signal FPW-1 received from controller 12 via electronic driver 168. In this manner, fuel injector 166 provides what is known as direct injection (hereafter referred to as "DI") of fuel into combustion cylinder 14. While FIG. 1 shows injector 166 positioned to one side of cylinder 14, it may alternatively be located overhead of the piston, such as near the position of spark plug 192. Such a position may facilitate mixing and combustion when operating the engine with an alternative, alcohol-based fuel due to the lower volatility of some alcohol-based fuels. Alternatively, the injector may be located overhead and near the intake valve to further facilitate mixing.

Fuel injector 170 is shown arranged in intake passage 146, rather than in cylinder 14, in an optional configuration that provides what is known as port injection of fuel (hereafter referred to as "PFI") into the intake port upstream of cylinder 14. Fuel injector 170 may inject fuel such as gasoline, received from fuel system 8, in proportion to the pulse width of signal FPW-2 received from controller 12 via electronic driver 171. Note that a single driver 168 or 171 may be used for both fuel injection systems, or multiple drivers, for example driver 168 for fuel injector 166 and driver 171 for fuel injector 170, may be used, as depicted.

As described above, FIG. 1 shows only one cylinder of a multi-cylinder engine. As such each cylinder may similarly include its own set of intake/exhaust valves, fuel injector(s), spark plug, etc. It will be appreciated that engine 10 may include any suitable number of cylinders, including 2, 3, 4, 5, 6, 8, 10, 12, or more cylinders. Further, each of these cylinders can include some or all of the various components described and depicted by FIG. 1 with reference to cylinder 14.

The engine may include an exhaust gas recirculation (EGR) system 147, including one or more exhaust gas recirculation passages for recirculating a portion of exhaust gas from the engine exhaust to the engine intake. As such, by recirculating some exhaust gas, an engine dilution may be affected which may increase engine performance by reducing engine knock, peak cylinder combustion temperatures and pressures, throttling losses, and NOx emissions. EGR system 147 includes an exhaust passage 148, through which exhaust gases may be recirculated to intake passage 144 via the EGR passage 141. In this example, the EGR passage 141 is coupled to the intake passage 144 upstream of the throttle 20, however, in alternate embodiments, the EGR passage 141 may be coupled to the intake passage 144 downstream of the throttle 20. A direction of flow of EGR through the EGR passage 141 is shown by arrow 181. The amount of EGR provided to intake passage 144 may be varied by controller 12 via EGR valve 143.

The EGR system 147 may include a first EGR pressure sensor 172 coupled to the EGR passage 141 upstream of the EGR valve 143 and a second EGR pressure sensor 174 coupled to the EGR passage 141 downstream of the EGR valve 143. A pressure in EGR passage 141 upstream of EGR valve 143 may be higher than a pressure in the EGR passage 141 downstream of EGR valve 143, where a difference in pressure upstream and downstream of the EGR valve may be directly proportion to an EGR flow rate. As such, a pressure differential across the EGR valve 143 as estimated based on outputs of the first EGR pressure sensor 172 and the second EGR pressure sensor 174 may be used to estimate the EGR flow rate through the EGR passage 141.

Further, additional EGR sensors may be arranged within the EGR passage and may provide an indication of temperature, and oxygen concentration of the exhaust gas. An EGR cooler 145 may be coupled to the EGR passage downstream or upstream of the EGR valve 143. A temperature sensor 177 may be coupled to the EGR passage downstream of the EGR cooler 145 to estimate a temperature of EGR exiting the EGR cooler 145.

When EGR valve 143 is open, a portion of the exhaust gas generated at the cylinder 14 is diverted to the EGR passage 141. Controller 12 may command opening of the EGR valve 143 based on the estimated EGR flow rate in combination with other input such as engine load, speed, and temperature. While constant EGR flow is desirable to suppress NOx formation, under certain conditions, the EGR valve 143 is maintained closed. For example, during cold starts, exhaust gas pressure is low and as a result, the EGR valve 143 is kept closed to allow gas pressure to accumulate. Similarly, during engine operation under zero load, such as idling, the EGR valve 143 is closed. Allowing EGR to flow during engine idling may lead to combustion instability and erratic idling. Furthermore, during engine operation under peak loads, e.g., the engine is operating close to or at maximum load, dilution at the combustion chamber due to EGR is not desired due to the diminished power output resulting from burning a gas mixture with lower oxygen concentration. Thus during high engine loads, the EGR valve 143 is also closed.

It will be appreciated that while the embodiment of FIG. 1 shows high pressure EGR (HP-EGR) via an HP-EGR passage coupled between the engine intake downstream of the turbocharger compressor and the engine exhaust upstream of the turbine, in alternate embodiments, the engine may be configured to also provide low pressure EGR (LP-EGR) being provided via an LP-EGR passage coupled between the engine intake upstream of the turbocharger compressor and the engine exhaust downstream of the turbine. In one example, an HP-EGR flow may be provided under conditions such as the absence of boost provided by the turbocharger, while an LP-EGR flow may be provided during conditions such as in the presence of turbocharger boost and/or when an exhaust gas temperature is above a threshold. When distinct HP-EGR and LP-EGR passages are included, the respective EGR flows may be controlled via adjustments to respective EGR valves.

Controller 12 is shown in FIG. 1 as a microcomputer, including microprocessor unit 106, input/output ports 108, an electronic storage medium for executable programs and calibration values shown as read-only memory chip 110 in this particular example, random access memory 112, keep alive memory 114, and a data bus. Controller 12 may receive various signals from sensors coupled to engine 10, in addition to those signals previously discussed, including measurement of inducted mass air flow (MAF) from MAF sensor 122; engine coolant temperature (ECT) from temperature sensor 116 coupled to cooling sleeve 118; a profile ignition pickup signal (PIP) from Hall effect sensor 120 (or other type) coupled to crankshaft 140; throttle position (TP) from a throttle position sensor; manifold absolute pressure signal (MAP) from sensor 124; EGR flow rate from first EGR pressure sensor 172 and second EGR pressure sensor 174. Engine speed signal, RPM, may be generated by controller 12 from signal PIP. Manifold pressure signal MAP from a manifold pressure sensor may be used to provide an indication of vacuum, or pressure, in the intake manifold. Still other sensors may include fuel level sensors and fuel composition sensors coupled to the fuel tank(s) of the fuel system.

Storage medium read-only memory 110 can be programmed with computer readable data representing instructions executable by microprocessor unit 106 for performing the methods described below as well as other variants that are anticipated but not specifically listed.

In some examples, vehicle 102 may be a hybrid vehicle with multiple sources of torque available to one or more vehicle wheels 55. In other examples, vehicle 102 is a conventional vehicle with only an engine, or an electric vehicle with only electric machine(s). In the example shown, vehicle 102 includes engine 10 and an electric machine 52. Electric machine 52 may be a motor or a motor/generator. Crankshaft 140 of engine 10 and electric machine 52 are connected via a transmission 54 to vehicle wheels 55 when one or more clutches 56 are engaged. In the depicted example, a first clutch 56 is provided between crankshaft 140 and electric machine 52, and a second clutch 56 is provided between electric machine 52 and transmission 54. Controller 12 may send a signal to an actuator of each clutch 56 to engage or disengage the clutch, so as to connect or disconnect crankshaft 140 from electric machine 52 and the components connected thereto, and/or connect or disconnect electric machine 52 from transmission 54 and the components connected thereto. Transmission 54 may be a gearbox, a planetary gear system, or another type of transmission. The powertrain may be configured in various manners including as a parallel, a series, or a series-parallel hybrid vehicle.

Electric machine 52 receives electrical power from a traction battery 58 to provide torque to vehicle wheels 55. Electric machine 52 may also be operated as a generator to provide electrical power to charge battery 58, for example during a braking operation.

Figure 2:
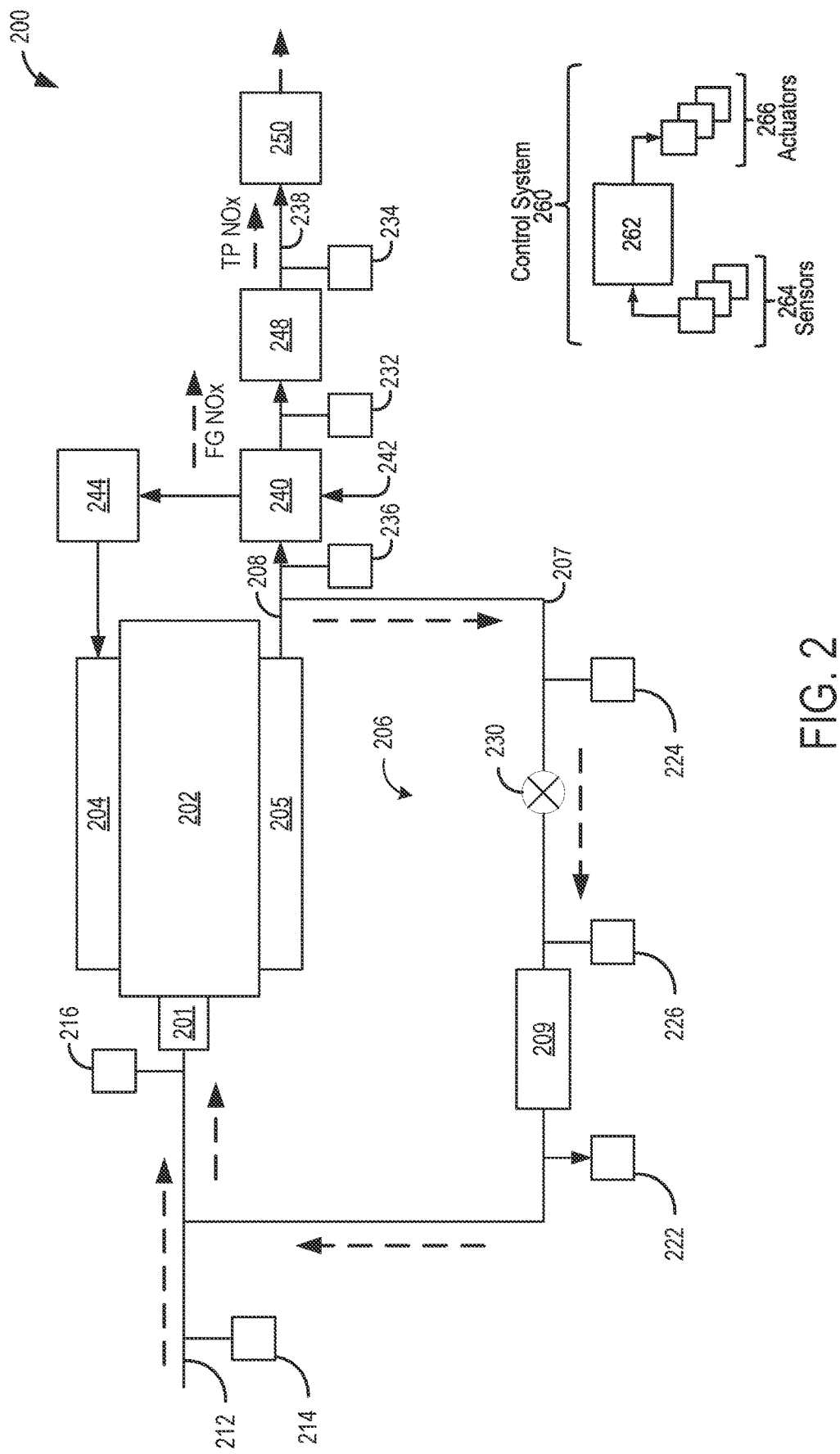
FIG. 2 shows a simplified vehicle engine system including an exhaust system.

Referring now to FIG. 2, a block diagram of an embodiment of an engine system 200 is shown. Engine system 200 may be a simplified version of engine system 100 of FIG. 1. In the illustrated embodiment, engine system 200 may be disposed in a vehicle such as an automobile or a truck. In still other embodiments, engine system 200 may be included in a different type of vehicle, or any other equipment that relies on tractive effort generated by a one or more engines.

Engine system 200 may include an engine 202, which may be a non-limiting embodiment of engine 10 of FIG. 1. Engine 202 includes a plurality of cylinders (not shown in FIG. 2) that may each include at least one intake valve, at least one exhaust valve, and at least one fuel injector. Each fuel injector may include an actuator that may be actuated via a signal from a control system 260 of engine 202. The cylinders of the engine may receive fuel from a fuel system (e.g., fuel system 8 of FIG. 1).

Engine system 200 may include an EGR system 206, such as EGR system 147 described above in reference to vehicle 102 of FIG. 1. Engine 202, which may receive fresh air at an intake manifold 201 via an intake passage 212. An air flow through intake passage 212 may be measured by a MAF sensor 214 (e.g., MAF sensor 122 of FIG. 1), and a pressure of air entering intake manifold 201 may be measured by a MAP sensor 216 (e.g., MAP sensor 124).

Engine 202 may output exhaust gases to an exhaust manifold 205. The exhaust gases may be routed from exhaust manifold 205 to an aftertreatment system 248 via an exhaust passage 208. An exhaust gas temperature sensor 236 (e.g., exhaust gas sensor 128 of FIG. 1) positioned on exhaust passage 208 may measure a temperature of the exhaust gases. The exhaust gases may be subsequently expelled to a tailpipe 250 via an exhaust passage 238, to be released into the environment. Aftertreatment system 248 may convert NOx to nitrogen and water, thereby reducing an amount of emissions released into the atmosphere via the exhaust gases. An engine-out NOx sensor 232 may be arranged at or upstream of an inlet of aftertreatment system 248, which may measure an amount of NOx in the exhaust gases prior to entering aftertreatment system 248. Additionally, a tailpipe NOx sensor 234 may be arranged on exhaust passage 238 downstream of aftertreatment system 248, which may measure an amount of NOx in the exhaust gases exiting aftertreatment system 248.

Catalysts are shown to exhibit a maximum (e.g., peak) conversion at a particular exhaust gas temperature. As such, for minimizing vehicle emissions, it may be desirable to maintain exhaust gases entering aftertreatment system 248 within a range of temperatures near a peak conversion temperature for NOx conversion. For example, no conversion may occur at low exhaust gas temperatures (e.g., below approximately 120° C.). As a temperature of the exhaust gases in the system increases, the conversion rates of a catalyst used to treat the exhaust gases via selective catalytic reduction (SCR) may increase. As the temperature of the exhaust gases increases above a first threshold temperature (e.g., 150° C.), the conversion rates may increase steeply with increasing temperature to maximum conversions rates. At high exhaust gas temperatures (e.g., 350° C.), the catalyst performance stabilizes to form a characteristic plateau on a conversion curve. As such, for minimizing vehicle emissions, it may be desirable to maintain exhaust gas temperatures at or near the peak conversion temperature for NOx conversion, and within a range in which typical SCR systems exhibit near maximum conversion efficiency.

Engine system 200 may include a turbocharger 240 arranged on exhaust passage 208. Turbocharger 240 increases an air charge of ambient air drawn into the air intake passage 212 in order to provide greater charge density during combustion to increase power output and/or engine-operating efficiency. Turbocharger 240 may include an engine air intake compressor, which may be at least partially driven by a turbine disposed in exhaust passage 208. As the turbine rotates, heat and kinetic energy in the exhaust gases may be converted into mechanical energy, which may be used to drive the engine air intake compressor to draw in fresh air through an air intake passage 242, and deliver pressurized air to intake manifold 204 (e.g., to provide a pressure boost to cylinders of the engine based on engine operating conditions). By compressing fresh air entering intake manifold 204 of engine 202, a performance of engine 202 may be increased.

Compressing the fresh air may also increase a temperature of the pressurized air. The temperature of the pressurized air may be reduced by a charge air cooler 244 arranged between turbocharger 240 and intake manifold 204, which may cool the pressurized air prior to delivery to engine 202.

Prior to entering the aftertreatment system 248, a portion of the exhaust gases may also be routed to intake manifold 201 of engine 202 via an EGR passage 207 (e.g., EGR passage 141). In some embodiments, charge air cooler 244 may be positioned on EGR passage 207. A temperature of the exhaust gases may be cooled prior to entering intake manifold 201 by an EGR cooler 209, based on a temperature measurement of the exhaust gases taken by a temperature sensor 222. In still other embodiments, EGR cooler 209 may be combined with charge air cooler 244.

A flow rate of the exhaust gases (e.g., an EGR flow rate) to intake manifold 201 may be controlled via an EGR valve 230, which may be adjusted by a controller of the vehicle (e.g., controller 12). In some driving scenarios, EGR valve 230 may be adjusted based on a detected pressure difference between exhaust gases upstream of EGR valve 230 and exhaust gases downstream of EGR valve 230. A pressure of the exhaust gases upstream of the EGR valve 230 may be measured by a first pressure sensor 224, and a pressure of the exhaust gases downstream of the EGR valve 230 may be measured by a second pressure sensor 226 (e.g., first EGR pressure sensor 172 and second EGR pressure sensor 174 of FIG. 1). In other driving scenarios, EGR valve 230 may be commanded closed to increase an airflow through aftertreatment system 248. For example, it may be desired to maximize the airflow through aftertreatment system 248 to decrease an amount of NOx released via tailpipe 250, as described below. When the mass flow is increased by closing EGR valve 230, the engine-out exhaust may be further diluted, which may lower the engine-out temperature (e.g., the temperature of exhaust gases entering the aftertreatment system). By lowering the temperature, an efficiency of aftertreatment system 248 may be increased (e.g., the SCR may be placed into a more peak efficiency zone), decreasing emissions.

Engine system 200 may include a control system 260. Control system 260 is shown receiving information from a plurality of sensors 264 (examples of which are described herein) and sending control signals to a plurality of actuators 266 (examples of which are described herein). For example, sensors 264 may include an engine speed sensor, an engine load sensor, a manifold absolute pressure (MAP) sensor, a barometric pressure (BP) sensor, an exhaust gas sensor located in exhaust manifold 205, and/or other sensors such as pressure, temperature, air/fuel ratio (AFR), and composition sensors coupled to various locations in engine system 200. As another example, the actuators may include one or more throttles and/or valves that may control a flow of exhaust gases through engine system 200, as described below. It should be appreciated that the examples provided herein are for illustrative purposes and other types of sensors and/or actuators may be included without departing from the scope of this disclosure.

The control system 260 may include a controller 262. Controller 262 may receive input data from the various sensors, process the input data, and trigger the actuators in response to the processed input data based on instruction or code programmed therein corresponding to one or more routines. Controller 262 may include a processor. The processor may generally include any number of microprocessors, ASICs, ICs, etc. Controller 262 may include a memory (e.g., FLASH, ROM, RAM, EPROM and/or EEPROM) that stores instructions that may be executed to carry out one more control routines. As discussed herein, memory includes any non-transient computer readable medium in which programming instructions are stored. For the purposes of this disclosure, the term tangible computer readable medium is expressly defined to include any type of computer readable storage. The example methods and systems may be implemented using coded instruction (e.g., computer readable instructions) stored on a non-transient computer readable medium such as a flash memory, a read-only memory (ROM), a random-access memory (RAM), a cache, or any other storage media in which information is stored for any duration (e.g. for extended period time periods, permanently, brief instances, for temporarily buffering, and/or for caching of the information). Computer memory of computer readable storage mediums as referenced herein may include volatile and non-volatile or removable and non-removable media for a storage of electronic-formatted information such as computer readable program instructions or modules of computer readable program instructions, data, etc. that may be stand-alone or as part of a computing device. Examples of computer memory may include any other medium which can be used to store the desired electronic format of information and which can be accessed by the processor or processors or at least a portion of a computing device.

Figure 3A:
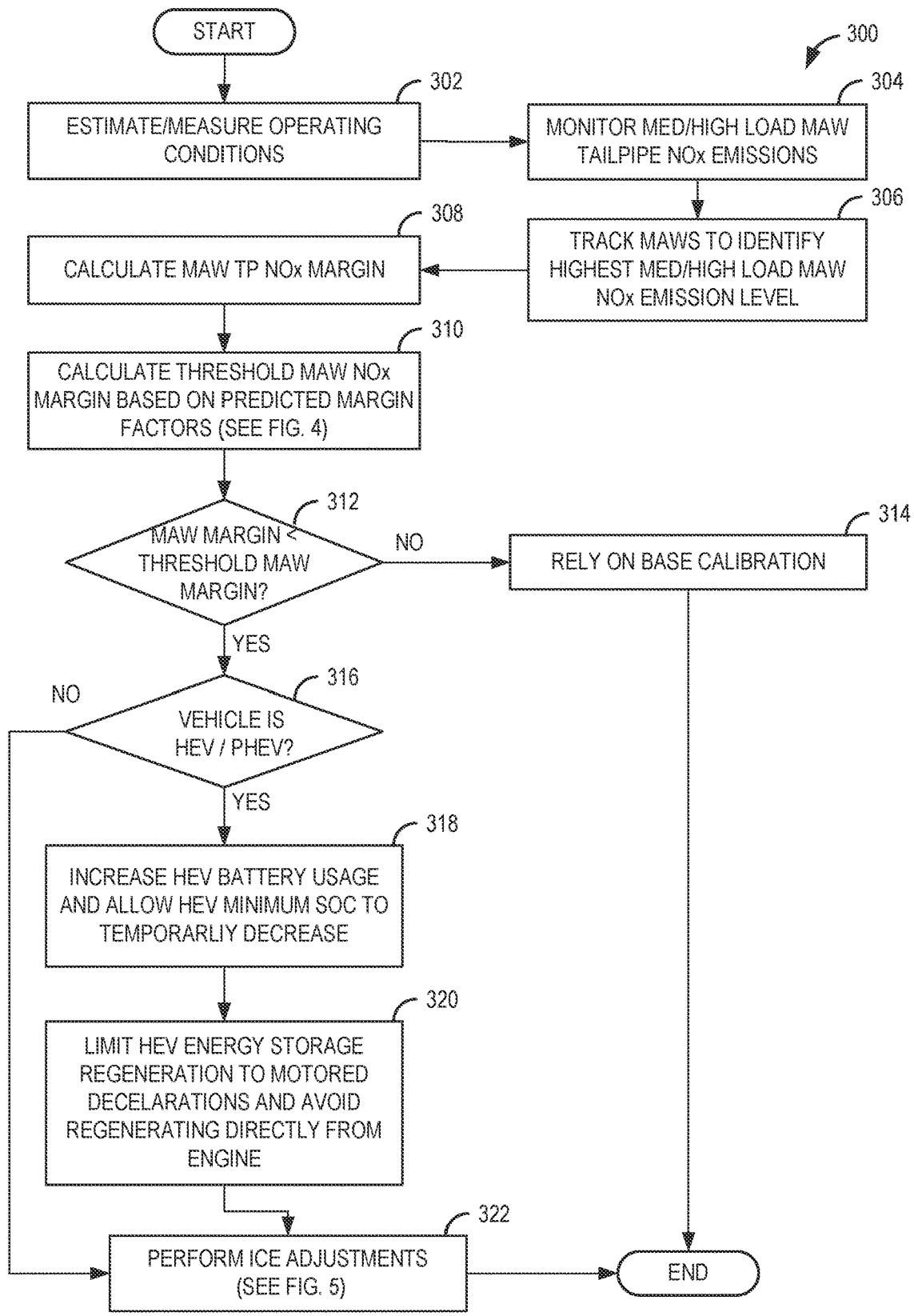
FIG. 3A shows a flowchart illustrating a first exemplary method for exemplary method for optimizing vehicle performance while maintaining vehicle emissions within a desired range, in accordance with one or more embodiments of the present disclosure.
Figure 3B:
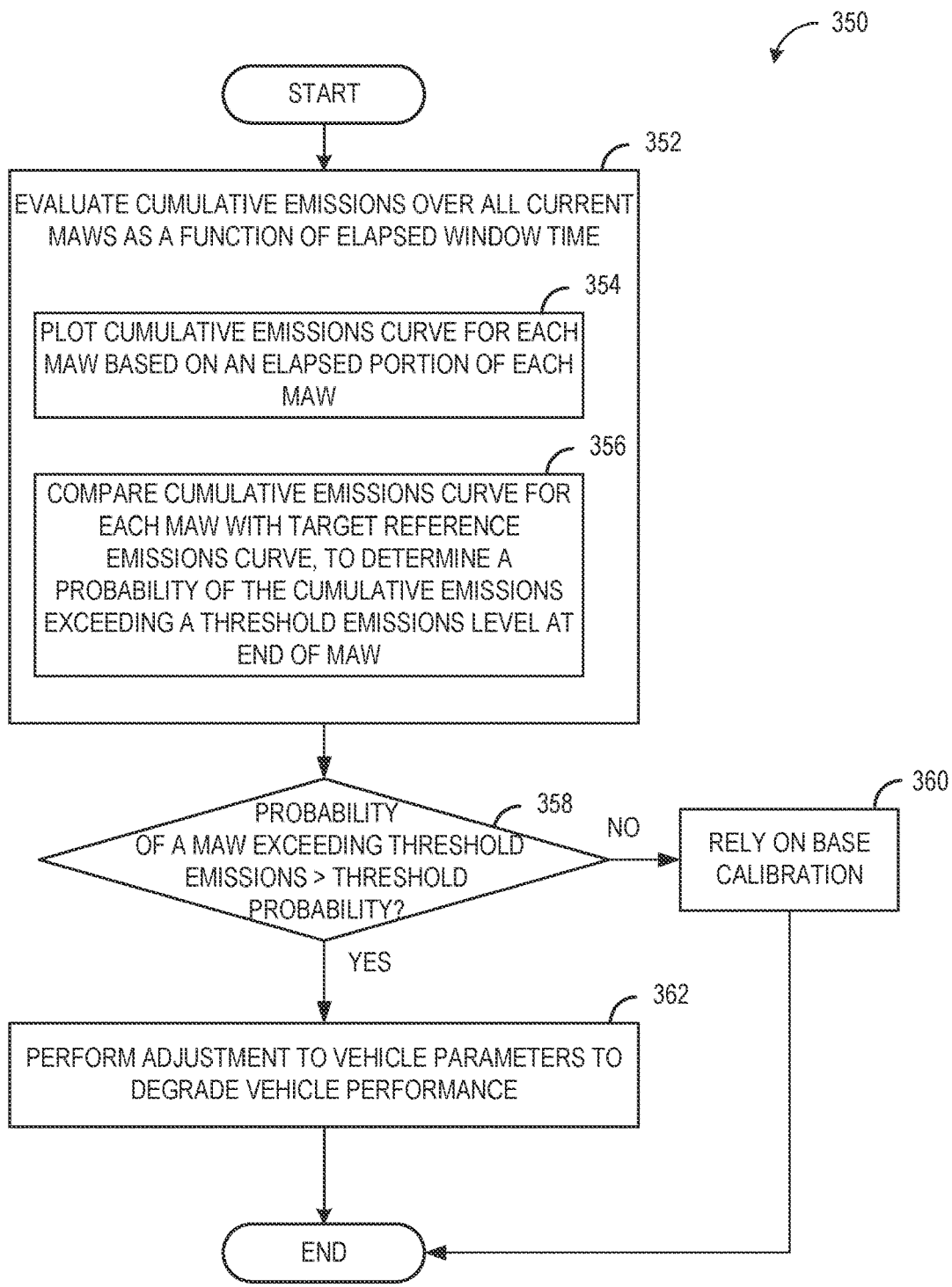
FIG. 3B shows a flowchart illustrating a second exemplary method for optimizing vehicle performance while maintaining vehicle emissions within a desired range, in accordance with one or more embodiments of the present disclosure.

FIG. 3A shows an example method 300 for optimizing a performance of a vehicle engine, such as engine 10 of vehicle 102 of FIG. 1, while maintaining an amount of emissions released into the atmosphere by the vehicle below a desired threshold value. In some embodiments, method 300 may be performed during various driving conditions. In other embodiments, method 300 may be performed during some driving conditions and may not be performed during other driving conditions. For example, in some embodiments, method 300 may be performed at higher engine loads (e.g., above a threshold load such as 0.4), and may not be performed at engine loads below the threshold. Instructions for carrying out method 300 and other methods described herein may be executed by a controller (e.g., controller 12 of FIG. 1 and/or controller 262 of FIG. 2), based on instructions stored on a memory of the controller and in conjunction with signals received from sensors of the engine system, such as the sensors described above with reference to FIGS. 1 and 2. The controller may employ engine actuators of the engine system to adjust engine operation, according to the methods described below.

Method 300 begins at 302, where method 300 includes evaluating operating conditions of the vehicle. Operating conditions may be estimated, measured, and/or inferred, and may include one or more vehicle conditions, such as vehicle speed, vehicle location, etc., various engine conditions, such as engine status, engine load, engine speed, A/F ratio, etc., various fuel system conditions, such as fuel level, fuel type, fuel temperature, etc., as well as various ambient conditions, such as ambient temperature, humidity, barometric pressure, etc. Evaluating the operating conditions of the vehicle may include determining whether an engine of the vehicle has been turned on and/or is operating. Evaluating the operating conditions of the vehicle may further include measuring a temperature of exhaust gases emitted by the engine, and measuring an amount of NOx in the exhaust gases released at a tailpipe of the vehicle. For example, the amount of NOx in the exhaust gases may be measured by a tailpipe NOx sensor, such as sensor 234 of FIG. 2.

At 304, method 300 includes monitoring moving average window (MAW) tailpipe NOx emissions of the vehicle, where the MAW tailpipe NOx emissions are an amount of NOx in the exhaust gases released at a tailpipe of the vehicle over a fixed duration time window (e.g., a MAW), during operation of the vehicle. The controller may monitor the MAW NOx emissions based on the tailpipe NOx sensor, exhaust flow measurement, and a fuel flow rate estimated based on a position of EGR valve 230 and/or measured/estimated via sensors 224 and 226 of FIG. 2, as described above.

During the operation of the vehicle, a plurality of MAWs may be started and ended in a staggered, overlapping fashion. During each MAW, MAW NOx emissions measurements may be taken at regular intervals from the tailpipe NOx sensor. For example, NOx measurements may be taken at intervals of 10 seconds. To determine the MAW tailpipe NOx emissions, an average in-use tailpipe NOx measurement over a predefined window duration may be calculated, based on the NOx measurements taken at the regular intervals. In one embodiment, the window duration is 300 seconds.

For example, a first, 300 second may commence. After 10 seconds, a first tailpipe NOx measurement may be taken. With the passage of subsequent 10 second intervals, additional tailpipe NOx measurements may be taken, until the 300 seconds has passed and the first window closes. When the first window closes, the tailpipe NOx measurements collected at intervals of 10 seconds during the first window may be averaged, to generate the MAW tailpipe NOx measurement for the first window (e.g., over the first window duration). Additionally, a second 300 second window may commence after a predefined duration has passed since the commencement of the first 300 second window. For example, the predefined duration may be 10 seconds, where the second 300 second window may commence 10 seconds after the first 300 second window commences (e.g., when the first tailpipe NOx measurement is taken). In other embodiments, the predefined duration may be a different duration, and the second 300 second window may commence after the different duration. Similarly, a third 300 second window may commence after the predefined duration has passed since the commencement of the second 300 second window; a fourth 300 second may commence after the predefined duration has passed since the commencement of the third 300 second window; and so on. In this way, a staggered set of MAW tailpipe NOx measurements may be generated, where an individual tailpipe NOx measurement may contribute to a plurality of MAW tailpipe NOx measurements for a respective plurality of windows currently open at any given time.

Referring briefly to FIG. 7, a MAW diagram 700 shows a plurality of staggered, overlapping MAWs that may be used to generate the MAW tailpipe NOx measurements. The plurality of MAWs are depicted on a y axis of MAW diagram 700, and a timing of each MAW of the plurality of MAWs is depicted in seconds on an x axis of MAW diagram 700. MAW diagram 700 includes a first MAW 702, a second MAW 704, a third MAW 706, a fourth MAW 708, a fifth MAW 710, a sixth MAW 712, and a seventh MAW 714, each with a same, fixed duration 750. In FIG. 7, fixed duration 750 is 300 seconds. A start of each MAW is staggered by an offset 720, which in FIG. 7 is 10 seconds. For example, MAW 702 starts at a time 0; MAW 704 starts at a time 10; MAW 706 starts at a time 20; MAW 708 starts at a time 30; and so on, where a start time of each MAW is equal to a start time of a previous MAW plus offset 720, and an end time of each MAW is equal to an end time of the previous MAW plus offset 720. In other embodiments, either or both of fixed duration 750 and offset 720 may be a different duration. For example, in another embodiment, fixed duration 750 may be 300 seconds, and offset 720 may be 20 seconds, or fixed duration 750 and offset 720 may be different durations.

During operation of the vehicle, tailpipe NOx emissions may be measured over a plurality of regular intervals, which are depicted as squares in MAW diagram 700. At the end of each MAW, the tailpipe NOx measurements may be averaged over the duration of the MAW (e.g., duration 750). For example, first MAW 702 includes 30 regular intervals 722, where a tailpipe NOx measurement may be taken each regular interval 722. Regular interval 722 has a duration 724, which in FIG. 7 is 10 seconds. In other embodiments, duration 724 may be a different amount of time. First MAW 702 starts at time 0, and ends at a time 300. At time 300, the 30 tailpipe NOx measurements taken at each regular interval 722 of first MAW 702 may be averaged, to determine an average MAW tailpipe NOx emissions value for first MAW 702. The average MAW tailpipe NOx emissions value may be used to predict a probability that future tailpipe NOx emissions will exceed a threshold NOx emissions value, as described in reference to FIGS. 3A and 3B.

Since the plurality of MAWs are staggered, a tailpipe NOx emissions measurement may be used to calculate the average MAW tailpipe NOx emissions value of a plurality of MAWs. For example, a tailpipe NOx emissions measurement taken at a point in time 730 may be included in a 10th regular interval of first MAW 702; a 9th regular interval of second MAW 704; an 8th regular interval of third MAW 706; a 7th regular interval of fourth MAW 708; a 6th regular interval of fifth MAW 710; a 5th regular interval of sixth MAW 712; and a 4th regular interval of seventh MAW 714. By comparing the average MAW tailpipe NOx emissions values of various MAWs over time, a trend in tailpipe NOx emissions may be more accurately determined or predicted than by comparing individual MAW tailpipe NOx emissions measurements, which may fluctuate.

Returning to method 300, in various embodiments, the MAW tailpipe NOx emissions may be monitored when the vehicle is operating under a medium or high workload, and the MAW tailpipe NOx emissions may not be monitored when the vehicle is operating under a lighter workload. Simulations have shown that as a vehicle's workload decreases, an in-use tailpipe NOx MAW margin increases relative to a predefined standard, indicating substantially lower emissions when the vehicle is lightly loaded or lightly driven by a driver. The workload may be calculated based on a gross combined weight rating (GCWR) and an acceleration of the vehicle. If one or both of the GCWR and the acceleration are higher, the workload may be higher, and if one or both of the GCWR and the acceleration lower, the workload may be lower. Since most drivers do not drive at max GCWR nor with 100% accelerator pedal actuation a majority of the time, it may not be desirable to sacrifice a response of the vehicle in lightly loaded use cases. Therefore, operating parameters of the engine may be adjusted when a measured or predicted workload is above a threshold workload, such as 75%. Thus, if a calculated workload exceeds a threshold workload, the MAW tailpipe NOx emissions may be monitored, and if the calculated workload does not exceed the threshold workload, the MAW tailpipe NOx emissions may not be monitored. In other embodiments, the MAW tailpipe NOx emissions may be monitored under lighter load conditions.

At 306, method 300 includes tracking a set of recent calculated MAW tailpipe NOx measurements to identify a current highest, medium/high load MAW tailpipe NOx measurement. In one embodiment, the set of recent MAW tailpipe NOx measurements includes the 2400 most recent MAW tailpipe NOx measurements. In other embodiments, the set of recent MAW tailpipe NOx measurements may be defined by a different number.

At 308, method 300 includes calculating a difference between the highest MAW tailpipe NOx measurement and a reference emissions value. The reference emissions value may be an in-use standard NOx emissions value, which may be a predefined value established by a government authority. The difference may be referred to herein as a MAW tailpipe NOx margin. The MAW tailpipe NOx margin may be calculated based on equation 1 indicated below:

$$\text{MAW\_NOx}_{margin} = \text{MAW\_NOx}_{in-use\ stanard} - \text{MAW\_NOx}_{Measured} \quad (1)$$

The controller may then monitor the MAW tailpipe NOx margin over a current drive scenario, and determine a probability that the MAW tailpipe NOx margin will decrease below a threshold MAW tailpipe NOx margin. If the MAW tailpipe NOx margin decreases below the MAW tailpipe NOx margin, operating parameters of the vehicle may be proactively adjusted to ensure that the emissions of the vehicle do not exceed the reference emissions value.

At 310, method 300 includes calculating the threshold MAW tailpipe NOx margin for controlling emissions. The threshold MAW tailpipe NOx margin may be based on an in-use standard NOx emissions value. In various embodiments, the threshold MAW tailpipe NOx margin may be predicted based on the in-use standard NOx emissions value, expected engine-out NOx emissions of the vehicle, and current NOx emissions sensitivities. For example, the current NOx emissions sensitivities may include a gross combination weight (GCW) of the vehicle; an elevation of the vehicle; an inclination of the vehicle; and/or a route of the vehicle, for example, if the route includes extended portions on a grade. Additionally, the threshold MAW tailpipe NOx margin may be predicted partly based on an aggressiveness of a driving style of a driver, which may be retrieved from a driver profile or estimated based on accelerometer and/or accelerator pedal position data of the driver. The threshold MAW tailpipe NOx margin may be predicted partly based on a predicted catalyst conversion efficiency in relation to the expected engine-out NOx emissions. For example, the catalyst conversion efficiency may depend on a temperature of a catalyst of an aftertreatment system of the vehicle; an age of the catalyst; an amount of anhydrous ammonia (NH3) stored at the aftertreatment system; and/or other factors. An additional factor that may be used in predicting the threshold MAW tailpipe NOx margin is an external air temperature and/or pressure, humidity, and/or other external weather conditions of the vehicle.

Further, a transient change in the threshold MAW tailpipe NOx margin can be combined with GPS, topological information, accelerometer data, and pedal response to project a future probability of excessive emissions, and preemptively calibrate the engine to achieve a desired NOx emissions level. Calculating the threshold MAW tailpipe NOx margin is described in greater detail below in reference to FIG. 4.

Figure 4:
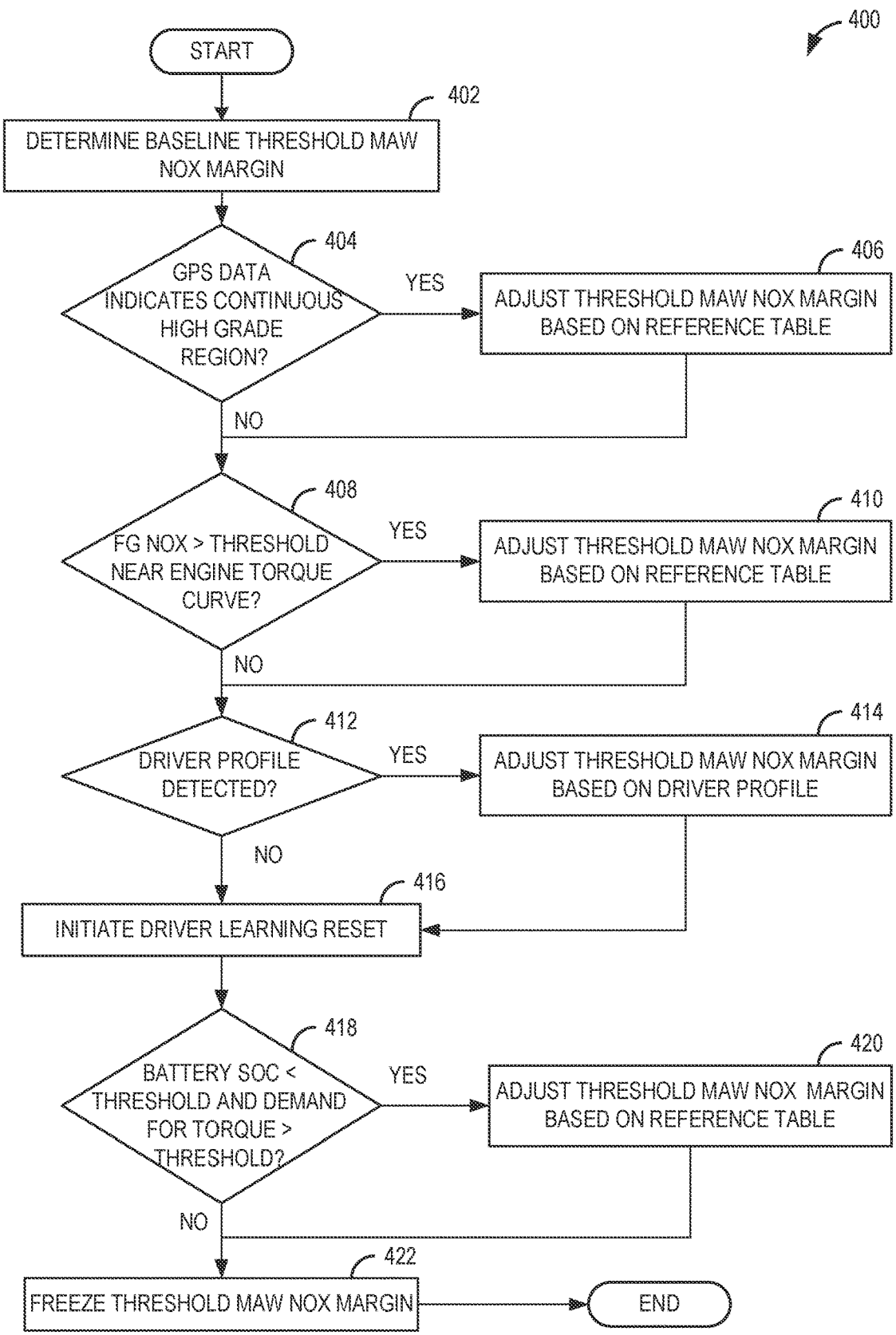
FIG. 4 shows a flowchart illustrating an exemplary method for calculating a minimum tailpipe NOx margin for controlling vehicle emissions, in accordance with one or more embodiments of the present disclosure.

In other embodiments, the threshold MAW NOx margin may be a fixed margin, and the calculated MAW tailpipe NOx margin may be predicted in a manner similar to that described in FIG. 4.

At 312, method 300 includes determining whether the calculated MAW tailpipe NOx margin is less than the predicted threshold MAW tailpipe NOx margin. If the calculated MAW tailpipe NOx margin is less than the threshold MAW tailpipe NOx margin, it may be inferred that an unacceptably high level of NOx emissions may be released from the vehicle into the atmosphere.

If at 312 it is determined that the calculated MAW tailpipe NOx margin is greater than the threshold MAW tailpipe NOx margin, method 300 proceeds to 314. At 314, method 300 includes relying on a base calibration of the vehicle operating parameters, and method 300 ends. The base calibration of the engine may be a configuration of vehicle and/or engine parameters that maintains the NOx emissions level of the vehicle within a desired range under general operating conditions and/or lighter loads. In other words, when the base calibration is relied on, operating parameters of the vehicle may not by adjusted to reduce emissions. Alternatively, if at 312 it is determined that the calculated MAW tailpipe NOx margin is less than or equal to the threshold MAW tailpipe NOx margin, the operating parameters of the vehicle may be adjusted to reduce emissions, whereby method 300 proceeds to 316.

At 316, method 300 includes determining whether the vehicle is a hybrid electric vehicle (HEV) or a plug-in hybrid electric vehicle (PHEV). If at 316 it is determined that the vehicle is an HEV or a PHEV, method 300 proceeds to 318.

At 318, method 300 includes increasing a battery usage of the HEV. Increasing the battery usage of the HEV may allow a state of charge (SOC) of the vehicle to temporarily decrease below a minimum SOC. By increasing the battery usage, a reliance of the vehicle on an internal combustion engine (ICE) for power may be reduced. As a result of the ICE contributing less power to the vehicle, the tailpipe NOx emissions of the vehicle may be reduced.

At 320, method 300 includes limiting an HEV energy storage regeneration of the vehicle to motored negative accelerations, and avoiding regenerating directly from the engine.

At 322, method 300 includes performing one or more adjustments to the ICE to reduce the tailpipe NOx emissions of the vehicle. Performing the one or more adjustments to the ICE to reduce the tailpipe NOx emissions of the vehicle is described in greater detail below in reference to FIG. 5.

Returning to 316, if it is determined that the vehicle is not an HEV or a PHEV, method 300 proceeds to 322, where the one or more adjustments to the ICE are performed, and method 300 ends.

Referring now to FIG. 3B, an example method 350 is shown for an early detection algorithm for determining a probability that NOx emitted by a vehicle, such as vehicle 102 of FIG. 1, will exceed a threshold NOx emissions level for one or more MAWs, where the probability is determined at an early stage of or prior to an end of a relevant MAW. If the probability exceeds a threshold probability, operating parameters of the vehicle may be adjusted to reduce the NOx emissions. In some embodiments, method 350 may be performed in conjunction with or in addition to method 300. For example, method 350 may be performed concurrently with method 300, where method 350 may detect a high probability of the NOx emitted by a vehicle exceeding the threshold NOx emissions level before method 300 predicts that the NOx emitted by a vehicle will exceed the threshold NOx emissions level (e.g., based on a decreasing MAW tailpipe NOx margin). In such cases, a performance of the vehicle may be degraded earlier, and to a lesser extent, than if method 300 were relied on.

Method 350 begins at 352, where method 350 includes evaluating cumulative NOx emissions levels over all current MAWs as a function of elapsed window time. At 354, evaluating cumulative NOx emissions levels over all current MAWs as a function of elapsed window time further comprises plotting a cumulative NOx emissions curve for each MAW of the current MAWs based on an elapsed portion of each MAW.

For example, referring again to FIG. 7, at the point in time 730, a NOx measurement may be taken and included in each of the seven current MAWs depicted. The NOx measurement may be a $10^{th}$ consecutive measurement of first MAW 702; a $9^{th}$ consecutive measurement of second MAW 704; an $8^{th}$ consecutive measurement of third MAW 706; a $7^{th}$ consecutive measurement of fourth MAW 708; a $6^{th}$ consecutive measurement of fifth MAW 710; a $5^{th}$ consecutive measurement of sixth MAW 712; and a $4^{th}$ consecutive measurement of seventh MAW 714. For each of the depicted MAWs, a cumulative NOx emissions curve may be generated based on an elapsed time. A first curve based on 10 measurements may be generated for MAW 702; a second curve based on 9 measurements may be generated for MAW 704; a third curve based on 8 measurements may be generated for MAW 706; a fourth curve based on 7 measurements may be generated for MAW 708; a fifth curve based on 6 measurements may be generated for MAW 710; a sixth curve based on 5 measurements may be generated for MAW 712; and a seventh curve based on 4 measurements may be generated for MAW 714. As a result of earlier MAWs including more NOx measurements, the first curve may be more predictive (at point 730) of a total amount of NOx that will be emitted by the vehicle over MAW 702, than the seventh curve is predictive of a total amount of NOx that will be emitted by the vehicle over MAW 714. As time progresses, each of the curves become more predictive of the average amount of NOx emitted by the vehicle.

Returning to method 350 of FIG. 3B, at 356, evaluating the cumulative NOx emissions over all current MAWs as a function of elapsed window time further comprises comparing the cumulative NOx emissions curve for each MAW with a target NOx emissions curve, to determine a probability of the cumulative NOx emissions over the respective MAW exceeding a threshold NOx emissions level. The target NOx emissions curve may indicate an expected or desired emission of NOx over the course of the MAW. In various embodiments, the target NOx emissions curve may be selected from a plurality of reference NOx emissions curves stored in a reference table in a memory of the controller, based on expected engine-out NOx emissions of the vehicle, current NOx emissions sensitivities, and/or a predicted catalyst conversion efficiency in relation to the expected engine-out NOx emissions.

At 358, method 350 includes determining whether a probability of an MAW exceeding a threshold NOx emissions level is greater than a threshold probability. In one embodiment, the threshold probability is 75%. If at 358 it is determined that the probability of an MAW exceeding the threshold NOx emissions level is not greater than the threshold probability, method 350 proceeds to 360. At 360, method 350 includes relying on a base calibration of the vehicle operating parameters, and method 350 ends. Relying on the base calibration of the vehicle operating parameters may include not adjusting the vehicle operating parameters, and maintaining vehicle operating conditions.

In some embodiments, the probability of an MAW exceeding the threshold NOx emissions level may be compared with various threshold probabilities, and adjustments of different types and/or magnitudes may be performed to the operating parameters of the vehicle depending on a specific threshold probability exceeded.

If at 358 it is determined that the probability of an MAW exceeding the threshold NOx emissions level is greater than the threshold probability, method 350 proceeds to 362. At 362, method 350 includes performing an adjustment to the vehicle operating parameters to degrade a performance of the vehicle, and method 350 ends. In various embodiments, the adjustment to the vehicle operating parameters may be performed by following one or more steps (e.g., steps 318 and 320) of method 300 and/or method 500 described below in reference to FIG. 4 and FIG. 5. In other words, method 300 and method 350 may be performed concurrently. A first adjustment of the vehicle operating conditions may be performed based on method 300, and a second adjustment of the vehicle operating conditions may be performed based on method 350. If it is determined by method 350 that that the probability of an MAW exceeding the threshold NOx emissions level is greater than the threshold probability, prior to it being determined by method 300 that a MAW NOx margin is less than a threshold MAW NOx margin, the second adjustment of the operating conditions may be performed prior to performing the first adjustment, or the first adjustment may not be performed. As a result of the second adjustment being performed earlier, additional time may be provided for the NOx emissions to be reduced, whereby the second adjustment may degrade the performance of the vehicle less than the first adjustment.

As an example of how methods 300 and 400 may be used in conjunction, during a driving scenario, an early detection controller of method 350 may continuously plot a plurality of NOx emission curves for a respective plurality of current MAWs, each NOx emission curve corresponding to a cumulative emissions level of the vehicle based on an elapsed portion of a respective current MAW. The early detection controller may then perform a running comparison between each NOx emission curve and a reference NOx emission curve retrieved from a reference table (e.g., based on characteristics of the vehicle and/or the driving scenario, current NOx conversion efficiency levels, etc.). Based on the running comparison, the early detection controller may detect that NOx emission curves of one or more MAWs may intersect with the reference NOx emission curve, which may indicate that the cumulative emissions level of the vehicle over the one or more MAWs has a high probability of exceeding a threshold emissions level. To ensure that the cumulative emissions level of the vehicle does not exceed the threshold emissions level, the early detection controller may perform an early adjustment of vehicle parameters to degrade the performance of the vehicle.

In accordance with method 300, a second emissions controller may concurrently monitor a difference (e.g., a margin) between a calculated MAW NOx emissions level (based on a current driving scenario of the vehicle) and a threshold MAW NOx emissions level. After the early adjustment of the vehicle parameters is performed by the early detection controller, the second emissions controller may detect that the difference decreases below a minimum desirable (e.g., threshold) MAW NOx margin, where the minimum desirable MAW NOx margin is calculated based on a plurality of predicted margin factors. In response to the second emissions controller detecting that the difference has decreased below the minimum desirable MAW NOx margin, the second emissions controller may perform a late adjustment of the vehicle operating parameters to further degrade the performance of the vehicle, to ensure that the NOx emissions level of the vehicle does not exceed the threshold emissions level. The late adjustment may degrade the vehicle performance more than the early adjustment. In this way, both of the early adjustment and the late adjustment may be relied on to maintain the NOx emissions level of the vehicle below a desired threshold.

Referring now to FIG. 4, an example method 400 is shown for predicting a threshold MAW tailpipe NOx margin for controlling emissions released into the atmosphere by an engine of a vehicle, such as engine 10 of vehicle 102 of FIG. 1. In various embodiments, method 400 may be performed by a controller of the vehicle as part of method 300 described above. The threshold MAW tailpipe NOx margin may be affected by a number of compounding factors, including but not limited to vehicle gross combined weight (GCW), catalyst state (temperature, anhydrous ammonia (NH3) storage, age), elevation, inclination, route, weather (humidity, temperature, wind), and driver aggressiveness. As such, a prior step to calculating the threshold MAW tailpipe NOx margin may be to predict a set of the compounding factors to be considered in the calculation. For example, in a first driving scenario, the threshold MAW tailpipe NOx margin may be affected by a high external temperature (e.g., hot summer conditions), a heavy combined weight of the vehicle, and a high elevation, but not by driver aggressiveness, humidity, or vehicle inclination. In a second driving scenario, the threshold MAW tailpipe NOx margin may be affected by driver aggressiveness while driving up an incline, but not by a high external temperature, a heavy combined weight of the vehicle, or a high elevation. Thus, a different set of factors may be selected for calculating the threshold MAW tailpipe NOx margin in the first driving scenario than in the second driving scenario. It should be appreciated that the steps of method 400 included below may be based on a predicted set of factors for an exemplary driving scenario, and in other driving scenarios, method 400 may include different factors and/or a greater or lesser number of factors.

Method 400 begins at 402, where method 400 includes determining a baseline threshold MAW NOx margin. In various embodiments, the baseline threshold MAW NOx margin may be retrieved from a reference table based on the factors described above. For example, a baseline threshold MAW NOx margin may be predicted based on measured or estimated data regarding a GCW, elevation, and/or inclination of the vehicle, external weather conditions, etc. In some embodiments, the baseline threshold MAW NOx margin may be predicted by an emissions margin prediction algorithm. The emissions margin prediction algorithm may be based on an artificial intelligence (AI) or machine learning (ML) model, such as a neural network. For example, the factors used to determine the baseline threshold MAW NOx margin may be inputs into the neural network, and the baseline threshold MAW NOx margin may be an output of the neural network. The neural network may also output prediction confidence levels for current and future MAWs, where the emissions margin prediction algorithm uses the prediction confidence levels to generate the baseline threshold MAW NOx margin. In other embodiments, a rule-based system may be used, where the baseline threshold MAW NOx margin is determined based on various rules created by human experts based on the estimated data. In still other embodiments, the baseline threshold MAW NOx margin may be estimated using a probability network, such as a Bayesian network, or a different kind of statistical algorithm. It should be appreciated that the examples provided herein are for illustrative purposes, and other types of predictive tools and/or networks may be used without departing from the scope of this disclosure.

At 404, method 400 includes determining whether global positioning service (GPS) data of the vehicle indicates a continuous high-grade region in a current driving scenario of the vehicle. In various embodiments, the GPS data may be received from an onboard navigation system of the vehicle. For example, a driver of the vehicle may specify a route on which the vehicle will be driven in the current driving scenario, and the route may be cross-referenced with known geographical and/or elevation data to determine whether the route includes the continuous high-grade region.

If at 404 it is determined that the vehicle may be operated in the continuous high-grade region during the current driving scenario, method 400 proceeds to 406. At 406, method 400 includes adjusting the baseline threshold MAW NOx margin based on a first reference table or vehicle-specific correlation stored in a memory of the controller. For example, the baseline threshold MAW NOx margin may be decreased. Alternatively, if at 404 it is determined that the vehicle may not be operated in the continuous high-grade region during the current driving scenario, or may be operated in a lower-grade region, method 400 proceeds to 408.

At 408, method 400 includes determining whether high residence times are detected at conditions with higher-than-expected engine-out NOx, where measured engine-out NOx values are close to a measured torque curve of the engine. In various embodiments, the engine-out NOx values may be measured by a engine-out NOx sensor, such as engine-out NOx sensor 232 of FIG. 2. The high residence times at conditions with higher-than-expected feed gas NOx may be detected based on a pedal acceleration history of the vehicle, a vehicle load, an accelerometer root-mean-square (RMS) calculation, or other measurable factors.

If at 408 it is determined that the feed gas NOx is above a threshold feed gas NOx value for one or more threshold durations, method 400 proceeds to 410. At 410, method 400 includes adjusting the baseline threshold MAW NOx margin based on a second reference table or vehicle-specific correlation stored in the memory of the controller. For example, the baseline threshold MAW NOx margin may be decreased. Alternatively, if at 408 it is determined that the feed gas NOx is not above the threshold feed gas NOx value for the one or more threshold durations, method 400 proceeds to 412.

At 412, method 400 includes determining whether a driver profile is detected. The driver profile may be stored in a memory of a controller of the vehicle, such as controller 262 of FIG. 2. In various embodiments, the driver may be identified by a key fob of the driver, or by facial recognition software via an in-cabin camera of the vehicle, and the driver profile associated with the identified driver he retrieved from the memory. In other embodiments, the driver may be detected based on an estimated driver weight or height, for example, via a seat weight sensor and/or seat position sensor of the vehicle, or by a different method.

If the driver profile is detected, method 400 proceeds to 414. At 414, method 400 includes adjusting the baseline threshold MAW NOx margin based on the driver profile. For example, the driver profile may indicate that the driver has an aggressive driving style associated with a higher generation of emissions, whereby the baseline threshold MAW NOx margin may be decreased a first, greater amount. Alternatively, the driver profile may indicate that the driver has a cautious driving style, whereby the baseline threshold MAW NOx margin may not be adjusted, or may be adjusted a second, lesser amount. The amount of the adjustment may be established in a third reference table or vehicle-specific correlation stored in a memory of the controller.

If at 412 a driver profile is not detected, method 400 proceeds to 416. At 416, method 400 includes initiating a reset of a driver learning module of the controller. When the driver learning reset is performed, a driving style of the driver may be assessed without considering driving behaviors of the driver performed prior to the current driving scenario.

At 418, method 400 includes determining whether a state of charge (SOC) of a battery of the vehicle is less than a threshold state of charge (e.g., 75%), while a demand for torque issued by the driver exceeds a threshold torque (e.g., 50%) of the vehicle. If at 418 it is determined that the battery SOC is less than the threshold state of charge and the demand for torque exceeds the threshold torque, method 400 proceeds to 420.

At 420, method 400 includes adjusting the baseline threshold MAW NOx margin based on a fourth reference table or vehicle-specific correlation stored in the memory of the controller. In other words, if the vehicle is a hybrid electric vehicle and as a result of a decreased SOC of the electrical system, the vehicle needs to leverage the engine to generate power in response to a demand for torque by the driver, the baseline threshold MAW NOx margin may be decreased accordingly.

If at 418 it is determined that the battery SOC is not less than the threshold state of charge and/or the demand for torque does not exceed the threshold torque, method 400 proceeds to 422. At 422, method 400 includes freezing the baseline threshold MAW NOx margin. When the baseline threshold MAW NOx margin is frozen, the various accumulated adjustments made in method 400 may be maintained and may not be further adjusted, and method 400 ends.

Figure 5:
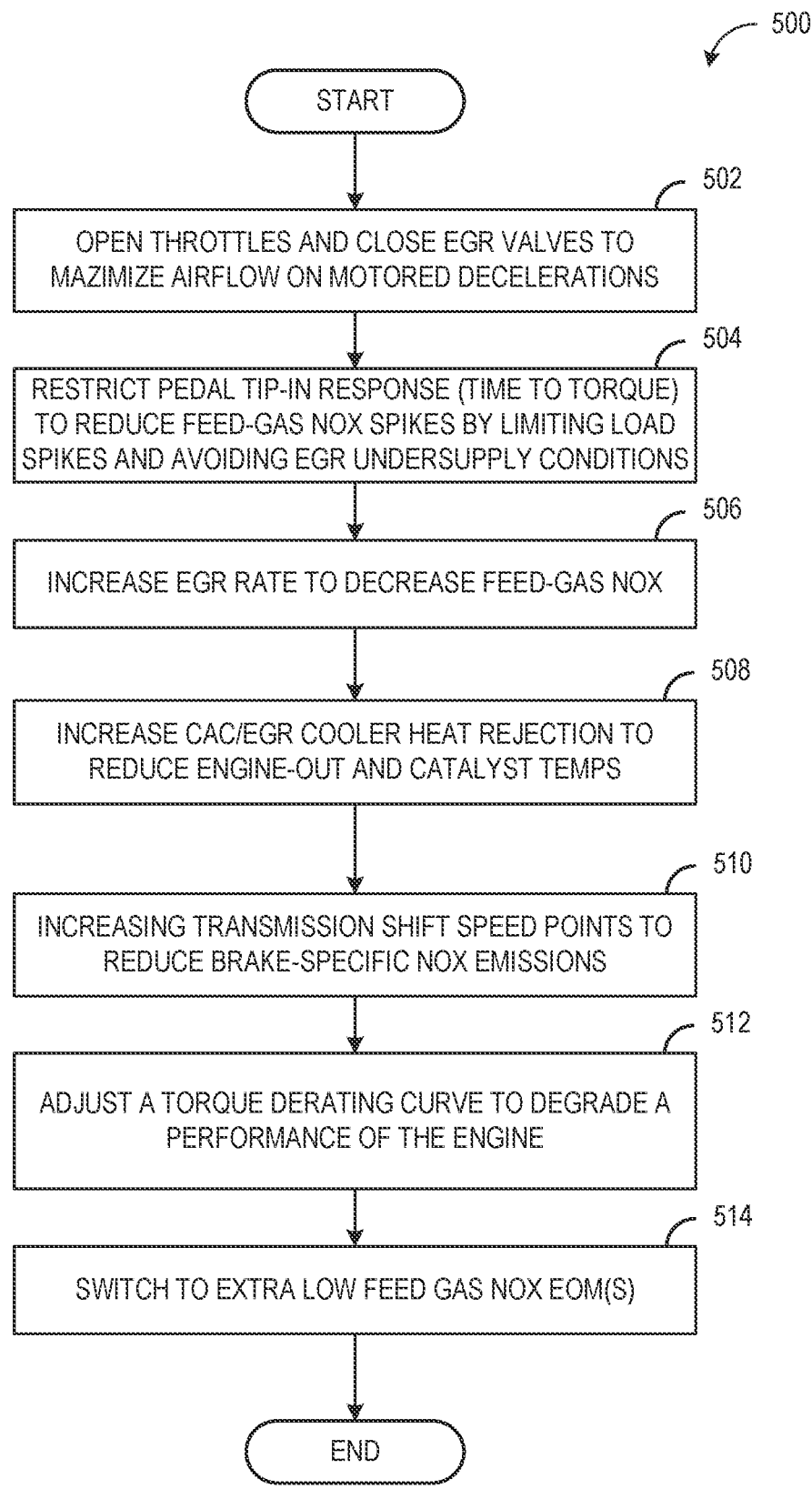
FIG. 5 shows a flowchart illustrating an exemplary method for reducing vehicle emissions, in accordance with one or more embodiments of the present disclosure.

FIG. 5 shows an example method 500 for controlling emissions released into the atmosphere by an engine of a vehicle, such as engine 10 of vehicle 102 of FIG. 1, by performing adjustments to various engine parameters of the vehicle. In various embodiments, method 500 may be performed by a controller of the vehicle as part of method 300 described above. It should be further appreciated that in different embodiments and/or different driving scenarios, the steps of method 500 may be performed in a different order, and a greater or fewer number of steps may be performed without departing from the scope of this disclosure.

Method 500 begins at 502, where method 500 includes opening one or more throttles of the vehicle and/or closing one or more EGR valves of the vehicle during a motored negative acceleration (e.g., deceleration) of the vehicle. The throttles of the vehicle may include, for example, throttle 20 of FIG. 1. The one or more EGR valves may include, for example, EGR valve 143 of FIG. 1 and/or EGR valve 230 of FIG. 2. When the one or more throttles of the vehicle and/or one or more EGR valves of the vehicle are closed during motored negative accelerations, an airflow through an aftertreatment system of the vehicle (e.g., aftertreatment system 248 of FIG. 2) may be maximized, resulting in a decreased amount of NOx emissions released out of a tailpipe of the vehicle and/or decreased catalyst temperatures.

At 504, method 500 includes restricting an accelerator pedal tip-in response of the vehicle, to reduce increases in engine-out NOx (e.g., engine-out NOx spikes). Restricting the pedal tip-in response may include increasing an amount of time (e.g., delaying) between pressure on an accelerator pedal of the vehicle being detected by the controller and a torque being applied to a drive shaft of the engine. By restricting the pedal tip-in response, engine load spikes may be limited, and EGR undersupply conditions may be avoided, resulting in decreased emissions.

At 506, method 500 includes increasing an EGR flow rate of the vehicle, to reduce an amount of NOx in exhaust gases entering the aftertreatment system. For example, an EGR valve (e.g., EGR valve 230) may be commanded to a fully open position to increase the flow rate. In some scenarios, the EGR valve may be commanded to the fully open position except during the motored negative accelerations, and may be commanded closed during the motored negative accelerations, as described above.

At 508, method 500 includes increasing a heat transfer (e.g., by adjusting a flow rate of the coolant) from exhaust gases to an engine coolant performed by a charge air cooler and/or EGR cooler of the vehicle, to reduce a temperature of engine-out exhaust gases released from the engine to the aftertreatment system. Reducing the temperature of the engine-out exhaust gases may reduce the temperature of one or more catalysts used by the aftertreatment system. By reducing the catalyst temperatures, an efficiency of NOx conversion may be increased, resulting in a lesser amount of tailpipe NOx emissions.

At 510, method 500 includes increasing transmission shift speed points to reduce brake-specific NOx emissions. In other words, by delaying shifting until the vehicle achieves a higher engine speed (same power-lower torque) may reduce the brake-specific NOx emissions. Additionally, delaying shifting may reduce catalyst temperatures.

At 512, method 500 includes applying a torque curve derate to avoid conditions that may generate high engine-out NOx and high engine-out exhaust gas temperatures. Applying the torque curve derate may include adjusting a torque curve that defines an amount of torque requested of the engine based on a pressure on an accelerator of the vehicle (e.g., as measured by an accelerator pedal position sensor of the vehicle). The torque curve may be adjusted to degrade the performance of the engine, for example, by decreasing the amount of torque requested at one or more pedal positions.

At 514, method 500 includes switching to an engine operation mode (EOM) that reduces engine-out NOx. For example, the engine may be operating under a first EOM that typically produces a first amount of engine-out NOx. The controller may determine that a second EOM may be used, which typically produces a second amount of engine-out NOx, where the second amount is less than the first amount. As a result of the determination, the controller may switch from the first EOM to the second EOM.

Thus, method 500 presents various adjustments to engine operating parameters, which once performed, may individually and/or collectively reduce an amount of NOx released from a tailpipe of the vehicle. The various adjustments may all be performed, or a portion of the adjustments may be performed. Additionally, the various adjustments may be performed in a different order in different embodiments. In some embodiments, a greater or lesser set of adjustments may be performed, or different adjustments than those described above may be made.

Referring now to FIG. 6, a first example timing diagram 600 shows an exemplary sequence of actions that may be performed to reduce an amount of emissions released into the atmosphere by a hybrid vehicle, such as vehicle 102 of FIG. 1. The actions may be performed, or commanded, via a controller of the hybrid vehicle, such as controller 12 of FIG. 1 and/or controller 262 of FIG. 2, based on instructions stored on a memory of the controller and in conjunction with signals received from sensors of an engine system of the vehicle, such as the sensors described above with reference to FIGS. 1 and 2. The controller may employ engine actuators of the engine system to adjust engine and/or vehicle operation, in accordance with timing diagram 600.

A horizontal (x-axis) of timing diagram 600 denotes time and the vertical markers t1-t3 identify significant times during operation of the vehicle. Timing diagram 600 includes nine plots. A first plot, line 602, shows an amount of NOx released from a tailpipe of the vehicle, which may be measured by a tailpipe NOx sensor (e.g., tailpipe NOx sensor 234 of FIG. 2). A dotted line 601 indicates a first trigger point at which a first, early detection algorithm determines that the tailpipe NOx may exceed a threshold MAW NOx emission level (e.g., in accordance with method 350). A dotted line 603 indicates a second trigger point at which a second algorithm determines that the tailpipe NOx may exceed the threshold MAW NOx emission level (e.g., in accordance with method 350). A dotted line 605 indicates the threshold MAW NOx emission level. A second plot, line 604, shows a degree of opening of an EGR valve (e.g., EGR valve 143 and/or EGR valve 230) controlling EGR flow from an exhaust passage to an intake passage of the engine via the EGR passage. A third plot, line 606, shows a degree of opening of a throttle of the vehicle (e.g., throttle 20 of FIG. 1). A fourth plot, line 608, shows a change in a temperature of exhaust gases exiting an engine of the vehicle, as measured via an exhaust gas temperature sensor (e.g., exhaust gas temperature sensor 236). A fifth plot, line 610, denotes an EGR flow rate, as controlled by the EGR valve. A sixth plot, line 612, shows an engine load. A seventh plot, line 614, shows an SOC of a battery of the hybrid vehicle. An eighth plot, line 616, shows two EOMs: a first, higher-engine-out EOM, and a second, lower-engine-out EOM. A ninth plot, line 618, shows a performance of the engine, which may be high, or degraded.

Prior to time t1, the vehicle is operating with the engine in a steady state. The EGR valve and the throttle are partially open, and the engine load is increasing as shown by line 612. For example, the vehicle may be operating up an incline. As a result of the engine load increasing, the tailpipe NOx emitted by the vehicle is also increasing. The engine is operating in a high engine-out EOM, and a performance of the engine is high.

At time t1, the tailpipe NOx increases to the first trigger point. At the first trigger point, the early detection algorithm (described above in reference to FIG. 3B) may determine that a curve representing a cumulative emissions level over one or more current MAWs as a function of an elapsed window time, if unchanged, may intersect a target curve representing an expected or desired cumulative emissions level over the one or more current MAWs. Based on the determination, the controller may predict that there is a high probability of the tailpipe NOx exceeding the threshold MAW emission level. In response to the predicted high probability of the tailpipe NOx exceeding the threshold MAW emission level, the controller performs a first set of adjustments to operating parameters of the vehicle and/or engine to reduce the tailpipe NOx emissions.

The first set of adjustments includes adjusting the EGR valve to a more open position (as shown by line 604); adjusting the throttle to a more open position (as shown by line 606); relying to a greater degree on a battery of the hybrid vehicle for propulsion; increasing a heat transfer from engine-out exhaust gases to a coolant at a charge air cooler and/or EGR cooler of the vehicle to reduce catalyst temperatures; increasing transmission shift speed points to reduce brake-specific NOx emissions; restricting a tip-in response of the vehicle and adjusting a torque derating curve to degrade a performance of the engine. By degrading the performance of the engine, engine-out NOx and catalyst temperatures may be reduced.

Between t1 and t2, as a result of performing the first set of adjustments, the temperature of the exhaust gas (and one or more catalysts of an aftertreatment system of the vehicle) stops increasing, as shown by line 608. The EGR flow rate continues to increase. The battery SOC decreases as the vehicle relies more on the battery for propulsion. The performance of the engine is degraded by a first amount. The tailpipe NOx emissions line 602 begins to flatten, indicating that emissions continue to increase, but at a lower rate. The engine load (line 612) continues to increase.

At time t2, the tailpipe NOx increases to the second trigger point indicated by dotted line 603. At the second trigger point, the second algorithm (described above in reference to FIG. 3A) determines that a margin between current MAW tailpipe NOx emissions and the threshold MAW emission level decreases below a predicted threshold margin (e.g., in accordance with method 300). Based on the determination, the controller may predict that there is a high probability of the tailpipe NOx exceeding the threshold MAW emission level. In response to the predicted high probability of the tailpipe NOx exceeding the threshold MAW emission level, the controller performs a second set of adjustments to operating parameters of the vehicle and/or engine to reduce the tailpipe NOx emissions.

The second set of adjustments include switching from the higher engine-out EOM to a lower engine-out EOM, as shown by line 616. The second set of adjustments also include further degrading the performance of the vehicle, as shown by line 618, for example, by further restricting the tip-in response of the vehicle and further adjusting the torque derating curve. The EGR valve and the throttle are adjusted to fully open positions, increasing the EGR flow rate. A performance of the charge air cooler and/or EGR cooler may be further increased, resulting decreased exhaust gas (and catalyst) temperatures. As shown by line 618, the performance of the vehicle is more degraded by performing the second set of adjustments to the vehicle and/or engine operating parameters than by performing the first set of adjustments.

Between time t2 and t3, as a result of performing the second set of adjustments, the tailpipe NOx emissions begin to decrease, without achieving the threshold MAW NOx emission level indicated by dotted line 605. The second set of adjustments are continued and maintained until time t3.

At time t3, the tailpipe NOx emissions indicated by line 602 decrease below the first trigger point, where the tailpipe NOx emissions achieve an acceptable level (e.g., with a low probability of achieving the threshold MAW NOx emission level). As a result of the tailpipe NOx emissions achieving the acceptable level, the EGR valve and the throttle are adjusted from the fully open position to a more closed position. The EGR flow rate decreases, and the battery SOC begins to increase as the battery is no longer used to propel the vehicle. The controller switches from the lower engine-out EOM to a higher engine-out EOM, and the engine performance is no longer degraded.

Between time t3 and t4, the engine load is maintained at a stable load (e.g., not increasing or decreasing), and the tailpipe NOx continues to decrease. At time t4, vehicle operating conditions similar to a t0 are achieved.

Thus, as shown in the timing diagram of FIG. 6 and described in reference to methods 300 and 350, a tradeoff between vehicle performance and tailpipe NOx emissions may be controlled to ensure that vehicle performance is optimized while maintaining the tailpipe NOx emissions below a threshold level. If the tailpipe NOx emissions begin to increase, a first early detection algorithm performed at a controller of the vehicle may be used to predict a first probability that the tailpipe NOx emissions will increase above the threshold level. The first, early detection algorithm extrapolates from MAW NOx emissions measured during a beginning of a MAW to predict average MAW NOx emissions over a completed MAW. If the first probability is above a threshold probability, a first set of adjustments may be performed on a first set of engine or vehicle operating parameters to reduce the tailpipe NOx emissions.

If after performing the first set of adjustments the tailpipe NOx emissions continue to increase, a second algorithm performed at the controller, or a different controller of the vehicle, may be used to predict a second probability that the tailpipe NOx emissions will increase above the threshold level. The second algorithm may monitor a change in a margin between MAW NOx emissions and an MAW NOx emissions threshold over time, where the second probability is based on the margin decreasing below a predicted threshold MAW NOx margin. If the second probability is above a second threshold probability, a second set of adjustments may be performed on a second set of engine or vehicle operating parameters to reduce the tailpipe NOx emissions. The second set of engine or vehicle operating parameters may be the same as the first set of engine or vehicle operating parameters, or the second set may include more, less, or different engine or vehicle operating parameters as the first set of engine or vehicle operating parameters. The first adjustment may result in a first degradation of vehicle performance, and the second adjustment may result in a second degradation of vehicle performance, where the second degradation is greater than the first degradation. In this way, a graded response to increasing NOx emissions can be made, where if the first set of adjustments is not sufficient to maintain NOx emissions below the threshold level, the second, more severe set of adjustments may be performed to ensure that the NOx emissions do not achieve the threshold level.

The technical effect of predicting a probability that NOx emissions will increase above a threshold level is that adjustments may be made to vehicle operating parameters to ensure that the NOx emissions to not achieve the threshold level.

The disclosure also provides support for a method for a controller of a vehicle, the method comprising: adjusting an operating parameter of the vehicle in response to a margin between a moving average tailpipe NOx emissions and a threshold tailpipe NOx emissions decreasing below a threshold tailpipe NOx margin, the moving average tailpipe NOx emissions calculated at regular intervals over a plurality of overlapping moving average windows (MAWs) of measured tailpipe NOx emissions. In a first example of the method, adjusting the operating parameter of the vehicle includes adjusting an operating parameter of an engine of the vehicle. In a second example of the method, optionally including the first example, the threshold tailpipe NOx margin is predicted based on expected engine-out NOx emissions of the vehicle, current NOx emissions sensitivities, and/or a predicted catalyst conversion efficiency in relation to the expected engine-out NOx emissions. In a third example of the method, optionally including one or both of the first and second examples, predicting the threshold tailpipe NOx margin based on the current NOx emissions sensitivities further comprises predicting the threshold tailpipe NOx margin based at least partly on: a gross combination weight (GCW) of the vehicle, an elevation of the vehicle, an inclination of the vehicle, and a route of the vehicle. In a fourth example of the method, optionally including one or more or each of the first through third examples, predicting the threshold tailpipe NOx margin based on the current NOx emissions sensitivities further comprises predicting the threshold tailpipe NOx margin based at least partly on: a driver profile of a driver of the vehicle, an assessment of an aggressiveness of the driver. In a fifth example of the method, optionally including one or more or each of the first through fourth examples, predicting the threshold tailpipe NOx margin based on the predicted catalyst conversion efficiency further comprises predicting the threshold tailpipe NOx margin based at least partly on: a temperature of a catalyst of an aftertreatment system of the vehicle, an age of the catalyst, an amount of anhydrous ammonia (NH3) stored at the aftertreatment system, and external weather conditions of the vehicle. In a sixth example of the method, optionally including one or more or each of the first through fifth examples, predicting the threshold tailpipe NOx margin based on the current NOx emissions sensitivities further comprises: predicting a baseline threshold tailpipe NOx margin based on the current NOx emissions sensitivities using one of a machine learning model, a rule-based system, or a statistical model, adjusting the predicted threshold tailpipe NOx margin based on detecting a continuous high-grade region on a route of the vehicle based on global positioning service (GPS) data, adjusting the predicted threshold tailpipe NOx margin based on a detected driver profile of the driver, adjusting the predicted threshold tailpipe NOx margin in response to a state of charge (SOC) of a battery of the vehicle being less than a threshold SOC and a demand for torque by the driver exceeding a torque threshold. In a seventh example of the method, optionally including one or more or each of the first through sixth examples, adjusting the operating parameter of the engine further comprises one or more of: during a motored negative acceleration of the vehicle, opening a throttle disposed at an intake passage of the engine, and closing an exhaust gas regeneration (EGR) valve of an EGR system of the vehicle, restricting a tip-in response of the vehicle to reduce increases in engine-out NOx, increasing an EGR flow rate of the vehicle to reduce engine-out NOx, increasing a heat transfer from engine-out exhaust gases to a coolant at a charge air cooler and/or EGR cooler of the vehicle to reduce catalyst temperatures, increasing transmission shift speed points to reduce brake-specific NOx emissions, adjusting a torque derating curve to degrade a performance of the engine, and switching to an engine operation mode (EOM) that reduces engine-out NOx. In an eighth example of the method, optionally including one or more or each of the first through seventh examples, the vehicle is a hybrid electric vehicle (HEV), and adjusting the operating parameter of the vehicle further comprises at least one of: increasing a usage of a battery of the vehicle and allowing a minimum state of charge (SOC) of the battery to temporarily decrease, and limiting an energy storage regeneration to motored negative accelerations and not regenerating directly from engine. In a ninth example of the method, optionally including one or more or each of the first through eighth examples, in response to a workload of an engine of the vehicle being below a threshold workload, the threshold tailpipe NOx emissions is not predicted, and the operating parameter of the vehicle is not adjusted. In a tenth example of the method, optionally including one or more or each of the first through ninth examples, the method further comprises: in response to the margin not decreasing below the threshold tailpipe NOx margin, not adjusting the operating parameter of the vehicle, and relying on a base calibration of the operating parameter.

The disclosure also provides support for a method for a controller of a vehicle, the method comprising: measuring an amount of tailpipe NOx emitted by the vehicle, at regular intervals, over a staggered set of current moving average windows (MAWs) of a fixed duration, for each MAW of the staggered set of current MAWs, predicting a total cumulative amount of tailpipe NOx emitted by the vehicle over the MAW, based on tailpipe NOx measurements from an elapsed portion of the MAW, in response to the predicted total cumulative amount of tailpipe NOx exceeding a threshold amount of NOx, adjusting one or more operating parameters of the vehicle to reduce the predicted total cumulative amount of tailpipe NOx. In a first example of the method, predicting the total cumulative amount of tailpipe NOx emitted by the vehicle over the MAW based on tailpipe NOx measurements from the elapsed portion of the MAW further comprises: plotting a cumulative measured amount of tailpipe NOx as a function of elapsed time, to generate a cumulative NOx emissions curve for an elapsed portion of the MAW, comparing the cumulative NOx emissions curve to a target NOx emissions curve for the MAW to predict the total cumulative amount of tailpipe NOx emitted by the vehicle over the MAW. In a second example of the method, optionally including the first example, the method further comprises: selecting the target NOx emissions curve from a plurality of reference NOx emissions curves stored in a reference table in a memory of the controller, based on expected engine-out NOx emissions of the vehicle, current NOx emissions sensitivities, and/or a predicted catalyst conversion efficiency in relation to the expected engine-out NOx emissions. In a third example of the method, optionally including one or both of the first and second examples, adjusting the one or more operating parameters of the vehicle to reduce the predicted total cumulative amount of tailpipe NOx further comprises at least one of: during a motored negative acceleration of the vehicle, opening a throttle disposed at an intake passage of the engine, and closing an exhaust gas regeneration (EGR) valve of an EGR system of the vehicle, restricting a tip-in response of the vehicle to reduce increases in engine-out NOx, increasing an EGR flow rate of the vehicle to reduce engine-out NOx, increasing a heat transfer from engine-out exhaust gases to a coolant at a charge air cooler and/or EGR cooler of the vehicle to reduce catalyst temperatures, increasing transmission shift speed points to reduce brake-specific NOx emissions, adjusting a torque derating curve to degrade a performance of the engine, and switching to an engine operation mode (EOM) that reduces engine-out NOx. In a fourth example of the method, optionally including one or more or each of the first through third examples: in a first condition, the predicted total cumulative amount of tailpipe NOx exceeds the threshold amount of NOx, and the one or more operating parameters of the vehicle are adjusted to reduce the predicted total cumulative amount of tailpipe NOx, and in a second condition, the predicted total cumulative amount of tailpipe NOx does not exceed the threshold amount of NOx, the one or more operating parameters of the vehicle are not adjusted, and the vehicle is operated in accordance with a base calibration.

The disclosure also provides support for an engine system of a vehicle, comprising: a controller including a processor and instructions stored in a memory of the controller, that when executed, cause the controller to: via a tailpipe NOx sensor of the vehicle, measure an amount of tailpipe NOx emitted by the vehicle, at regular intervals over a staggered set of current moving average windows (MAWs) of a fixed duration, predict a probability of the amount of tailpipe NOx emissions exceeding a threshold amount of tailpipe NOx emissions by comparing a cumulative amount of tailpipe NOx generated during an elapsed portion of each MAW of the staggered set of current MAWs to a time-based cumulative NOx emissions allowance for the MAW, and in response to the probability increasing above a first threshold probability, perform a first adjustment to one or more operating parameters of the vehicle to decrease the amount of tailpipe NOx emissions, in response to the amount of tailpipe NOx emissions not decreasing as a result of the first adjustment: predict the probability of the amount of tailpipe NOx emissions exceeding the threshold amount of tailpipe NOx emissions based on whether a margin between an average amount of tailpipe NOx emitted over a MAW of the staggered set of current MAWs and a threshold MAW tailpipe NOx decreases below a predicted threshold tailpipe NOx margin, the threshold tailpipe NOx margin predicted based on expected engine-out NOx emissions of the vehicle, current NOx emissions sensitivities, and/or a predicted catalyst conversion efficiency in relation to the expected engine-out NOx emissions, and in response to the probability increasing above a second threshold probability, perform a second adjustment to one or more operating parameters of the vehicle to decrease the amount of tailpipe NOx emissions. In a first example of the system, comparing the cumulative amount of tailpipe NOx generated during the elapsed portion of the MAW to the time-based cumulative NOx emissions allowance for the MAW further comprises: plotting a cumulative measured amount of tailpipe NOx released during the MAW as a function of elapsed time, to generate a cumulative NOx emissions curve for the elapsed portion of the MAW, determining a probability that a projection of the cumulative NOx emissions curve over a remaining portion of the MAW intersects with a selected target NOx emissions curve for the MAW, the selected target NOx emissions curve based on expected engine-out NOx emissions of the vehicle, current NOx emissions sensitivities, and/or a predicted catalyst conversion efficiency in relation to the expected engine-out NOx emissions. In a second example of the system, optionally including the first example, the selected target NOx emissions curve is retrieved from a reference table stored in a memory of the controller. In a third example of the system, optionally including one or both of the first and second examples, the second adjustment results in a more degraded vehicle performance than the first adjustment.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations, and/or functions may be repeatedly performed depending on the particular strategy being used. Further, the described actions, operations, and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A method for a controller of a vehicle, the method comprising:
adjusting an operating parameter of an engine of the vehicle in response to a margin between a moving average tailpipe NOx emissions and a threshold tailpipe NOx emissions decreasing below a threshold tailpipe NOx margin, the moving average tailpipe NOx emissions calculated at regular intervals over a plurality of overlapping moving average windows (MAWs) of measured tailpipe NOx emissions;
wherein adjusting the operating parameter further comprises one or more of:
during a motored negative acceleration of the vehicle, opening a throttle disposed at an intake passage of the engine, and closing an exhaust gas regeneration (EGR) valve of an EGR system of the engine;
restricting a tip-in response of the vehicle to reduce increases in engine-out NOx;
increasing an EGR flow rate of the engine to reduce engine-out NOx;
increasing a heat transfer from engine-out exhaust gases to a coolant at a charge air cooler and/or EGR cooler of the vehicle to reduce catalyst temperatures;
increasing transmission shift speed points to reduce brake-specific NOx emissions and/or reduce catalyst temperatures;
adjusting a torque derating curve to degrade a performance of the engine; and
switching to an engine operation mode (EOM) that reduces engine-out NOx.

2. The method of claim 1, wherein the threshold tailpipe NOx margin is predicted based on expected engine-out NOx emissions of the vehicle, current NOx emissions sensitivities, and/or a predicted catalyst conversion efficiency in relation to the expected engine-out NOx emissions.

3. The method of claim 2, wherein predicting the threshold tailpipe NOx margin based on the current NOx emissions sensitivities further comprises predicting the threshold tailpipe NOx margin based at least partly on:
a gross combination weight (GCW) of the vehicle;
an elevation of the vehicle;
an inclination of the vehicle; and
a route of the vehicle.

4. The method of claim 2, wherein predicting the threshold tailpipe NOx margin based on the current NOx emissions sensitivities further comprises predicting the threshold tailpipe NOx margin based at least partly on:
a driver profile of a driver of the vehicle;
an assessment of an aggressiveness of the driver.

5. The method of claim 2, wherein predicting the threshold tailpipe NOx margin based on the predicted catalyst conversion efficiency further comprises predicting the threshold tailpipe NOx margin based at least partly on:
a temperature of a catalyst of an aftertreatment system of the vehicle;
an age of the catalyst;
an amount of anhydrous ammonia (NH3) stored at the aftertreatment system; and
an external air temperature, pressure, and/or humidity of the vehicle.

6. The method of claim 2, wherein predicting the threshold tailpipe NOx margin based on the current NOx emissions sensitivities further comprises:
predicting a baseline threshold tailpipe NOx margin based on the current NOx emissions sensitivities using one of a machine learning model, a rule-based system, or a statistical model;
adjusting the predicted threshold tailpipe NOx margin based on detecting a continuous high-grade region on a route of the vehicle based on global positioning service (GPS) data;
adjusting the predicted threshold tailpipe NOx margin based on a detected driver profile of the driver;
adjusting the predicted threshold tailpipe NOx margin in response to a state of charge (SOC) of a battery of the vehicle being less than a threshold SOC and a demand for torque by the driver exceeding a torque threshold.

7. The method of claim 1, wherein the vehicle is a hybrid electric vehicle (HEV), and adjusting the operating parameter of the vehicle further comprises at least one of:
increasing a usage of a battery of the vehicle and allowing a minimum state of charge (SOC) of the battery to temporarily decrease; and
limiting an energy storage regeneration to motored negative accelerations and not regenerating directly from engine.

8. The method of claim 1, wherein in response to a workload of an engine of the vehicle being below a threshold workload, the threshold tailpipe NOx emissions is not predicted, and the operating parameter of the vehicle is not adjusted.

9. The method of claim 1, further comprising, in response to the margin not decreasing below the threshold tailpipe NOx margin, not adjusting the operating parameter of the vehicle, and relying on a base calibration of the operating parameter.

10. The method of claim 1, further comprising:
predicting a probability of an amount of tailpipe NOx emissions exceeding the threshold tailpipe NOx emissions by comparing a cumulative amount of tailpipe NOx generated during an elapsed portion of each MAW of the plurality of overlapping MAWs to a time-based cumulative NOx emissions allowance for the MAW; and detecting an increase of the probability above a first threshold probability, and in response, performing a first adjustment to the operating parameter of the engine to decrease the amount of tailpipe NOx emissions.

11. The method of claim 10, wherein comparing the cumulative amount of tailpipe NOx generated during the elapsed portion of the MAW to the time-based cumulative NOx emissions allowance for the MAW further comprises:

plotting a cumulative measured amount of tailpipe NOx released during the MAW as a function of elapsed time, to generate a cumulative NOx emissions curve for the elapsed portion of the MAW; and determining a probability that a projection of the cumulative NOx emissions curve over a remaining portion of the MAW intersects with a selected target NOx emissions curve for the MAW, the selected target NOx emissions curve based on expected engine-out NOx emissions of the vehicle, current NOx emissions sensitivities, and/or a predicted catalyst conversion efficiency in relation to the expected engine-out NOx emissions.

12. A method for a controller of a vehicle, the method comprising:

measuring an amount of tailpipe NOx emitted by the vehicle, at regular intervals, over a staggered set of current moving average windows (MAWs) of a fixed duration;

for each MAW of the staggered set of current MAWs, predicting a total cumulative amount of tailpipe NOx emitted by the vehicle over the MAW, based on tailpipe NOx measurements from an elapsed portion of the MAW; and in response to the predicted total cumulative amount of tailpipe NOx exceeding a threshold amount of NOx, adjusting one or more operating parameters of the vehicle to reduce the predicted total cumulative amount of tailpipe NOx;

wherein adjusting the one or more operating parameters of the vehicle to reduce the predicted total cumulative amount of tailpipe NOx further comprises at least one of:

during a motored negative acceleration of the vehicle, opening a throttle disposed at an intake passage of an engine of the vehicle, and closing an exhaust gas regeneration (EGR) valve of an EGR system of the engine;

restricting a tip-in response of the vehicle to reduce increases in engine-out NOx;

increasing an EGR flow rate of the engine to reduce engine-out NOx;

increasing a heat transfer from engine-out exhaust gases to a coolant at a charge air cooler and/or EGR cooler of the vehicle to reduce catalyst temperatures;

increasing transmission shift speed points to reduce brake-specific NOx emissions and/or reduce catalyst temperatures;

adjusting a torque derating curve to degrade a performance of the engine; and switching to an engine operation mode (EOM) that reduces engine-out NOx.

13. The method of claim 12, wherein predicting the total cumulative amount of tailpipe NOx emitted by the vehicle over the MAW based on tailpipe NOx measurements from the elapsed portion of the MAW further comprises:

plotting a cumulative measured amount of tailpipe NOx as a function of elapsed time, to generate a cumulative NOx emissions curve for an elapsed portion of the MAW;

comparing the cumulative NOx emissions curve to a target NOx emissions curve for the MAW to predict the total cumulative amount of tailpipe NOx emitted by the vehicle over the MAW.

14. The method of claim 13, further comprising selecting the target NOx emissions curve from a plurality of reference NOx emissions curves stored in a reference table in a memory of the controller, based on expected engine-out NOx emissions of the vehicle, current NOx emissions sensitivities, and/or a predicted catalyst conversion efficiency in relation to the expected engine-out NOx emissions.

15. The method of claim 12, wherein:

in a first condition, the predicted total cumulative amount of tailpipe NOx exceeds the threshold amount of NOx, and the one or more operating parameters of the vehicle are adjusted to reduce the predicted total cumulative amount of tailpipe NOx; and in a second condition, the predicted total cumulative amount of tailpipe NOx does not exceed the threshold amount of NOx, the one or more operating parameters of the vehicle are not adjusted, and the vehicle is operated in accordance with a base calibration.

16. An engine system of a vehicle, comprising:

a controller including a processor and instructions stored in a memory of the controller, that when executed, cause the controller to:

via a tailpipe NOx sensor of the vehicle, measure an amount of tailpipe NOx emitted by the vehicle, at regular intervals over a staggered set of current moving average windows (MAWs) of a fixed duration;

predict a probability of the amount of tailpipe NOx emissions exceeding a threshold amount of tailpipe NOx emissions by comparing a cumulative amount of tailpipe NOx generated during an elapsed portion of each MAW of the staggered set of current MAWs to a time-based cumulative NOx emissions allowance for the MAW; and in response to the probability increasing above a first threshold probability, perform a first adjustment to one or more operating parameters of the vehicle to decrease the amount of tailpipe NOx emissions;

in response to the amount of tailpipe NOx emissions not decreasing as a result of the first adjustment:

predict the probability of the amount of tailpipe NOx emissions exceeding the threshold amount of tailpipe NOx emissions based on whether a margin between an average amount of tailpipe NOx emitted over a MAW of the staggered set of current MAWs and a threshold MAW tailpipe NOx decreases below a predicted threshold tailpipe NOx margin, the threshold tailpipe NOx margin predicted based on expected engine-out NOx emissions of the vehicle, current NOx emissions sensitivities, and/or a predicted catalyst conversion efficiency in relation to the expected engine-out NOx emissions; and in response to the probability increasing above a second threshold probability, perform a second adjustment to one or more operating parameters of the vehicle to decrease the amount of tailpipe NOx emissions.

17. The engine system of claim 16, wherein comparing the cumulative amount of tailpipe NOx generated during the elapsed portion of the MAW to the time-based cumulative NOx emissions allowance for the MAW further comprises:
  plotting a cumulative measured amount of tailpipe NOx released during the MAW as a function of elapsed time, to generate a cumulative NOx emissions curve for the elapsed portion of the MAW;
  determining a probability that a projection of the cumulative NOx emissions curve over a remaining portion of the MAW intersects with a selected target NOx emissions curve for the MAW, the selected target NOx emissions curve based on expected engine-out NOx emissions of the vehicle, current NOx emissions sensitivities, and/or a predicted catalyst conversion efficiency in relation to the expected engine-out NOx emissions.

18. The engine system of claim 17, wherein the selected target NOx emissions curve is retrieved from a reference table stored in a memory of the controller.

19. The engine system of claim 16, wherein the second adjustment results in a more degraded vehicle performance than the first adjustment.

* * * * *